United States Patent [19]

Kouno et al.

[11] Patent Number: 5,085,104
[45] Date of Patent: Feb. 4, 1992

[54] HYDRAULIC CONTROL APPARATUS FOR VEHICLE POWER TRANSMITTING SYSTEM

[75] Inventors: Katsumi Kouno, Toyota; Yuji Hattori, Susono; Kunio Morisawa, Toyota, all of Japan

[73] Assignee: Toyota Jidosha Kabushiki Kaisha, Toyota, Japan

[21] Appl. No.: 502,625

[22] Filed: Apr. 2, 1990

[30] Foreign Application Priority Data

| Apr. 12, 1989 | [JP] | Japan | 1-92130 |
| Apr. 12, 1989 | [JP] | Japan | 1-92131 |
| Apr. 12, 1989 | [JP] | Japan | 1-92132 |
| Apr. 12, 1989 | [JP] | Japan | 1-92133 |
| Dec. 7, 1989 | [JP] | Japan | 1-318190 |

[51] Int. Cl.⁵ ............................... B60K 41/14
[52] U.S. Cl. ........................... 74/866; 364/424.1
[58] Field of Search ................. 74/866; 364/424.1

[56] References Cited

U.S. PATENT DOCUMENTS

| 4,039,061 | 8/1977 | Pravot et al. | 74/866 X |
| 4,526,557 | 7/1985 | Tanaka et al. | 74/861 X |
| 4,701,853 | 10/1987 | Osanai | 74/866 X |
| 4,730,518 | 3/1988 | Miyawaki | 74/866 |
| 4,784,021 | 11/1988 | Morimoto | 74/868 |
| 4,803,900 | 2/1989 | Ohkumo | 74/866 |
| 4,829,433 | 5/1989 | Nakoni et al. | 74/866 X |
| 4,836,054 | 6/1989 | Kumura | 74/866 |
| 4,862,771 | 9/1989 | Kumura et al. | 74/866 |
| 4,899,279 | 2/1990 | Cote et al. | 74/866 X |
| 4,934,497 | 6/1990 | Ishizoki et al. | 192/4 A X |
| 4,936,403 | 6/1990 | Morimoto | 180/176 |

FOREIGN PATENT DOCUMENTS

| 51-25662 | 3/1976 | Japan . |
| 58-170958 | 10/1983 | Japan . |
| 62-122834 | 6/1987 | Japan . |

Primary Examiner—Richard Lorence
Assistant Examiner—David E. Henn
Attorney, Agent, or Firm—Oblon, Spivak, McClelland, Maier & Neustadt

[57] ABSTRACT

An apparatus for controlling a power transmitting system for an automotive vehicle having a continuously variable transmission including an actuating device for controlling a speed ratio thereof, the transmission transmitting power from an engine to drive wheels. The apparatus includes a device for determining a running speed of the vehicle, a device for determining a deceleration value of the vehicle, and a controller for determining a deceleration reference value based on the determined vehicle speed, and according to a predetermined relationship between the determined vehicle speed and the deceleration reference value. If the deceleration value exceeds the reference value, the controller commands the actuating device of the transmission to lower the speed ratio in a rapid shift-down mode.

31 Claims, 14 Drawing Sheets

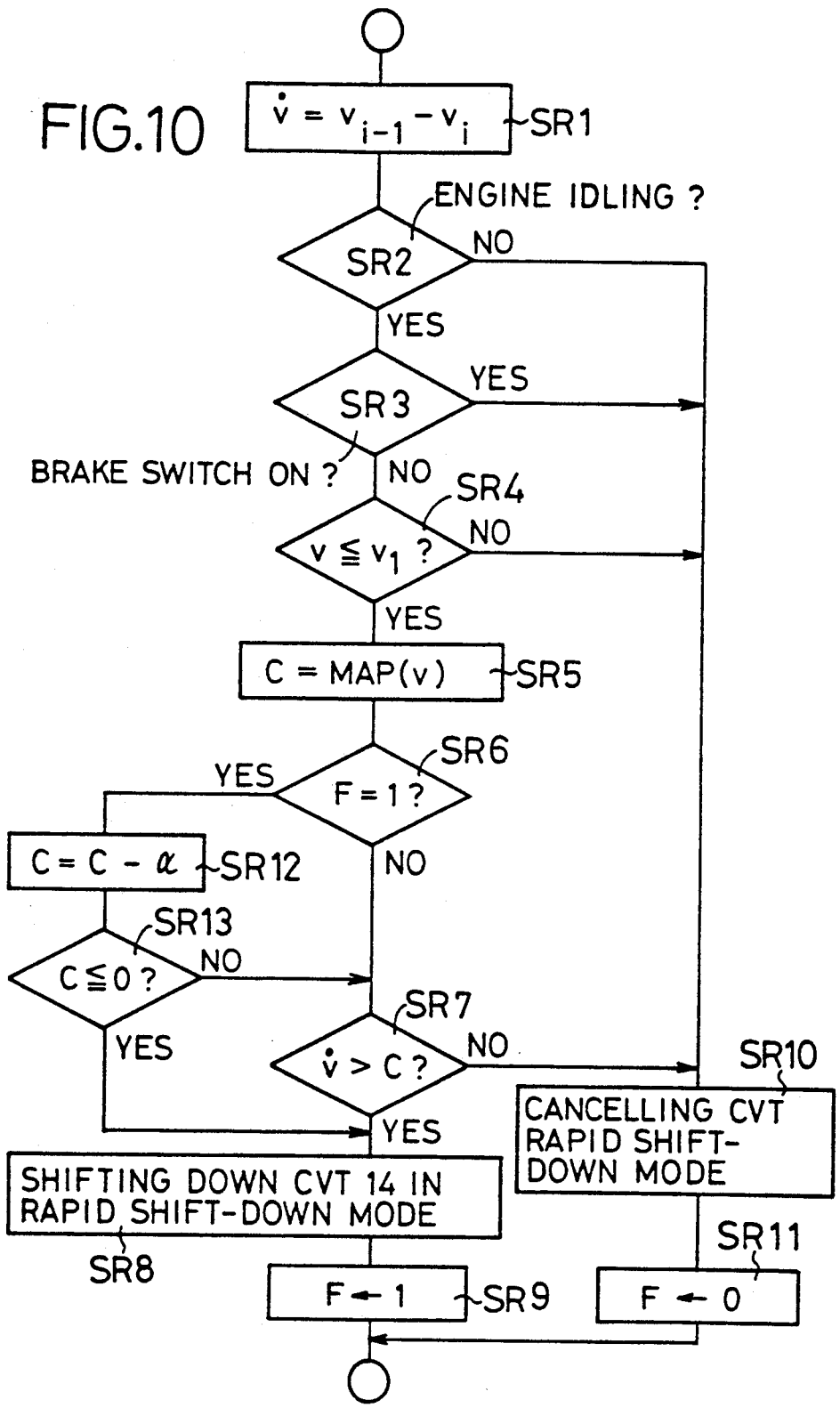

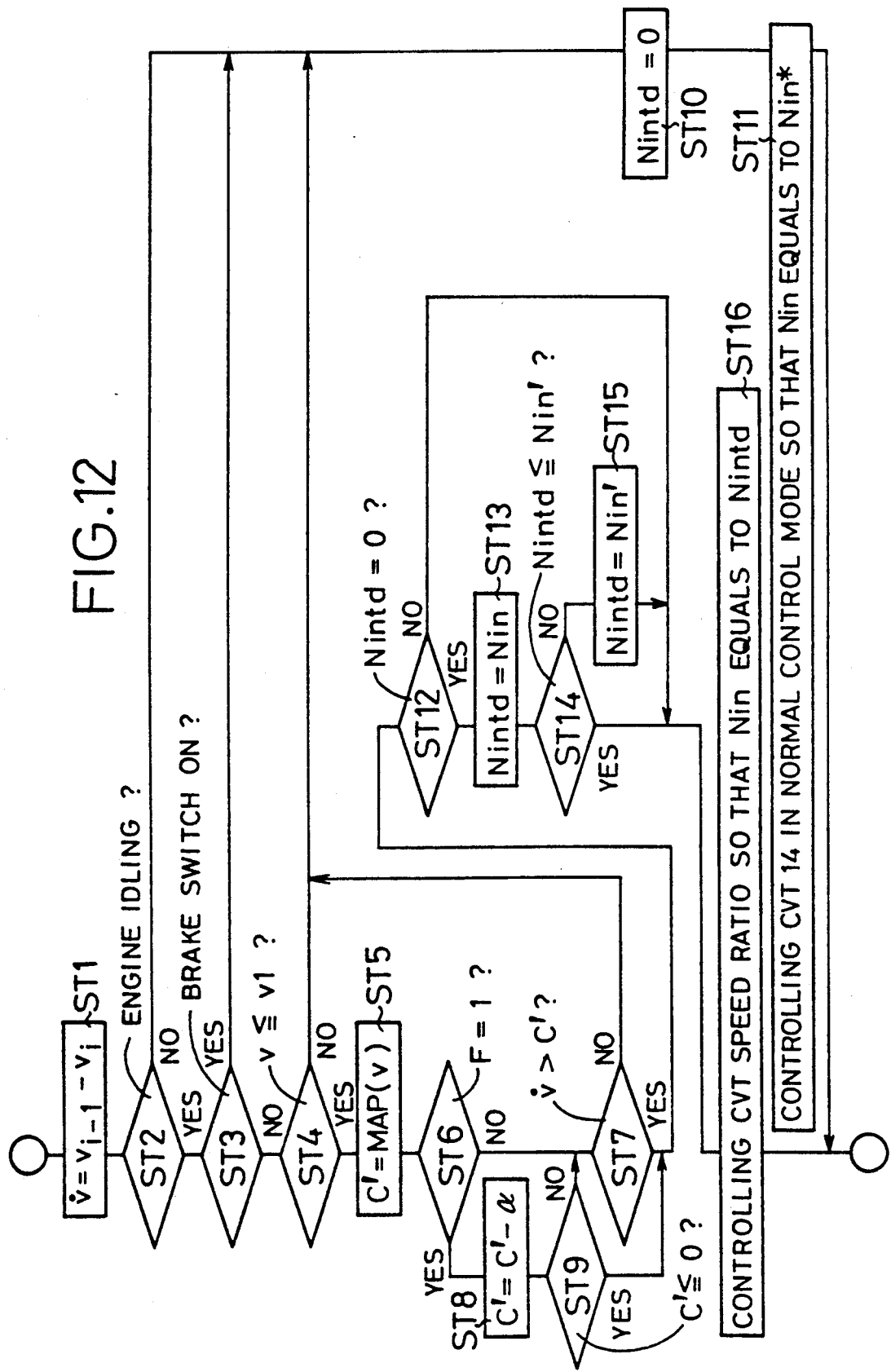

HYDRAULIC CONTROL APPARATUS FOR VEHICLE POWER TRANSMITTING SYSTEM

BACKGROUND OF THE INVENTION

1. Field of the Invention

The present invention relates to a control apparatus for controlling a continuously variable transmission for an automotive vehicle.

2. Discussion of the Prior Art

For a motor vehicle, there is known a continuously variable transmission which is adapted to transmit power from an engine to drive wheels, at a continuously variable speed ratio of the transmission. Usually, the speed ratio of such a continuously variable transmission is controlled so as to coincide with a desired or optimum value which is determined based on an amount of operation of an accelerator pedal (amount of opening of a throttle valve of the engine) and a running speed of the vehicle. In this arrangement, the transmission cannot be sufficiently shifted down to the position of the lowest speed ratio where the vehicle is stopped with an abrupt or sudden brake being applied to the wheels of the vehicle. In this case, the vehicle cannot be easily or smoothly re-started. In view of this drawback, laid-open Publication No. 58-170958 of unexamined Japanese Patent Application proposes a control apparatus which is adapted to initiate a shift-down operation of the continuously variable transmission upon reception of a signal indicative of the operation of a brake pedal, so that the speed ratio of the transmission can be lowered to the lowest value with improved reliability. This control apparatus uses the operation of the brake pedal as a signal which indicates a need for applying an engine brake to the vehicle. Namely, the control apparatus commands the transmission to be shifted down toward the position of the lowest speed ratio, to apply the engine brake to the vehicle when the apparatus receives the signal indicative of the operation of the brake pedal. However, this arrangement always causes the transmission to be shifted down to the position of the lowest speed ratio, irrespective of the amount of operation of the brake pedal, even when the vehicle driver who has depressed the brake pedal does not want such a shift-down action of the transmission. Accordingly, the above arrangement may result in an unexpected shift-down operation of the transmission, which deteriorates the driving comfort when the brake pedal is operated.

On the other hand, laid-open Publication No. 62-122834 proposes a control apparatus wherein the commanded optimum speed ratio of the continuously variable transmission or optimum speed of the engine is changed to a greater extent than usual, depending upon a deceleration value of the vehicle when brake is applied to the vehicle. This control arrangement permits a relatively rapid shift-down operation of the transmission, upon brake application to the vehicle, since a control error between the actual and optimum speed ratio values becomes larger than usual.

In the above arrangement, upon detection of brake application to the vehicle, the optimum speed of the engine is increased to thereby reduce the optimum speed ratio of the transmission, for positively increasing the speed ratio control error of the transmission, so that the continuously variable transmission is rapidly shifted down to the position of the lowest speed ratio. Consequently, engine braking is more or less applied to the vehicle, deteriorating the driving comfort of the vehicle. Where the vehicle is equipped with an anti-lock or anti-skid braking system, the rapid shift-down of the transmission to establish the lowest speed ratio will prevent the speeds of the abruptly braked wheels from rising back to the level prior to the braking, even after the anti-lock braking is released.

Where the continuously variable transmission is rapidly shifted down to the position of the lowest speed ratio only when an abrupt braking is applied to the vehicle, the shift-down operation of the transmission will not occur when a light braking is applied to the vehicle while the vehicle is running up an uphill road, for example. In this case, the vehicle may be stopped, but the transmission may not be shifted down to the lowest speed ratio position, and cannot be easily re-started.

SUMMARY OF THE INVENTION

It is therefore a first object of the present invention to provide an apparatus for controlling a vehicle continuously variable transmission, which permits the transmission to be rapidly shifted down to the position of the lowest speed ratio, without causing engine braking to the vehicle.

A second object of the invention is to provide an apparatus for controlling a continuously variable transmission for a vehicle equipped with an anti-lock braking system, which apparatus permits the transmission to be rapidly shifted down to the lowest speed ratio position, without deteriorating the anti-lock braking operation of the braking system.

A third object of the invention is to provide an apparatus for controlling a vehicle continuously variable transmission, which permits the transmission to be rapidly shifted down to the lowest speed ratio position, even when the vehicle is stopped on an uphill road.

The first object may be achieved according to the principle of the present invention, which provides an apparatus for controlling a power transmitting system for an automotive vehicle having a continuously variable transmission for transmitting power from an engine of the vehicle to drive wheels, with a controlled speed ratio of the transmission, the transmission including an actuating device for controlling the speed ratio, the apparatus comprising: vehicle speed determining means for determining a running speed of the vehicle; vehicle deceleration determining means for determining a deceleration value of the vehicle; and control means including means for determining a first deceleration reference value based on the determined running speed of the vehicle, and according to a predetermined relationship between the determined running speed and the first deceleration reference value. The control means is adapted to command the actuating device to shift down the transmission to lower the speed ratio in a rapid shift-down mode if the deceleration value of the vehicle determined by the vehicle deceleration determining means exceeds the first deceleration reference value.

In the control apparatus of the present invention constructed as described above, the reference value of the vehicle deceleration above which the continuously variable transmission is comparatively rapidly shifted down in the rapid shift-down mode is determined for the determined vehicle speed, according to the predetermined relationship, which may be determined such that the shift-down operation of the CVT will not cause an engine braking effect if it occurs while the vehicle deceleration value is higher than the first reference value. According to the present control apparatus, the control means commands the actuating device of the transmission, to rapidly shift down the transmission if the determined vehicle deceleration value exceeds the reference value. Thus, the continuously variable transmission is shifted down toward the position of the lowest speed ratio, while or before the vehicle is stopped, if the deceleration value is higher than the reference value. Consequently, the shift-down operation of the transmission will not give the vehicle driver a feeling of an engine brake applied to the vehicle, and the vehicle can be stopped without deteriorating the driving comfort. Further, the stopped vehicle can be smoothly re-started.

The control means may further include memory means for storing data representative of the predetermined relationship, which is determined such that a rate of increase in the first deceleration reference value decreases with an increase in the determined running speed of the vehicle. The apparatus may further comprise brake detecting means for generating a signal indicative of application of a brake to the vehicle. In this case, the control means is adapted to determine the first deceleration reference value and determine whether the determined first deceleration value of the vehicle exceeds the determined first deceleration reference values, when the signal is generated from the brake detecting means while the determined running speed of the vehicle is equal to a predetermined upper limit or lower.

Where the vehicle is equipped with an anti-lock braking system having an anti-lock brake control device, the second object described above may be attained according to one form of the invention. When a brake is applied to at least one of wheels which includes the drive wheels, the anti-lock brake control device controls a slip ratio of the at least one wheel, such that the slip ratio of the wheel or wheels under braking is held within a predetermined optimum range. In this case, the control means further includes means for determining whether the anti-lock brake control device is operating or not. If the anti-lock brake control device is operating, the control means commands the actuating device to control the speed ratio of the transmission in a normal control mode, in which the transmission is shifted to establish an optimum speed ratio. When the slip ratio of the wheel or wheels is reduced to fall within the optimum range as a result of the anti-lock brake control operation, the control means commands the actuating device to shift down the transmission in the rapid shift-down mode, if the determined deceleration value of the vehicle exceeds the first deceleration reference value.

The third object described above may be attained according to another aspect of the invention, which provides an apparatus for controlling a power transmitting system for an automotive vehicle having a continuously variable transmission for transmitting power from an engine of the vehicle to drive wheels, with a controlled speed ratio of the transmission, the transmission including an actuating device for controlling the speed ratio, the apparatus comprising: inertial uphill running detecting means for detecting an inertial running of the vehicle on an uphill road surface; and control means for commanding the actuating device to shift down the transmission to lower the speed ratio in a rapid shift-down mode if the inertial uphill running detecting means detects the inertial running of the vehicle on the uphill road surface. Accordingly, the vehicle stopped on the uphill road surface after the inertial running can be smoothly re-started on that uphill road surface.

The inertial uphill running detecting means may include means for determining whether the engine is idling or not, brake detecting means for generating a signal indicative of application of a brake to the vehicle, and means for determining whether the determined deceleration value of the vehicle exceeds a deceleration reference value or not. The inertial uphill running detecting means detects the inertial running of the vehicle on the uphill road surface, if the determined deceleration value exceeds the deceleration reference value while the vehicle is idling and while the signal of the brake detecting means is absent. The control means may further include memory means for storing data representative of a predetermined relationship between the determined running speed of the vehicle and the deceleration reference value. This relationship is determined such that the deceleration reference value increases with the determined running speed. The relationship between the determined running speed of the vehicle and the deceleration reference value may be determined such that a rate of increase in the deceleration reference value decreases with an increase in the determined running speed.

BRIEF DESCRIPTION OF THE DRAWINGS

The above and other objects, features and advantages of the present invention will become more apparent by reading the following detailed description of presently preferred embodiments of the present invention, when considered in conjunction with the accompanying drawings, in which:

FIG. 10 is a flow chart illustrating part of an operation according to a further embodiment of the invention;

FIG. 12 is a flow chart illustrating part of an operation according to a still further embodiment of the invention;

DETAILED DESCRIPTION OF THE PREFERRED EMBODIMENTS

Figure 1:
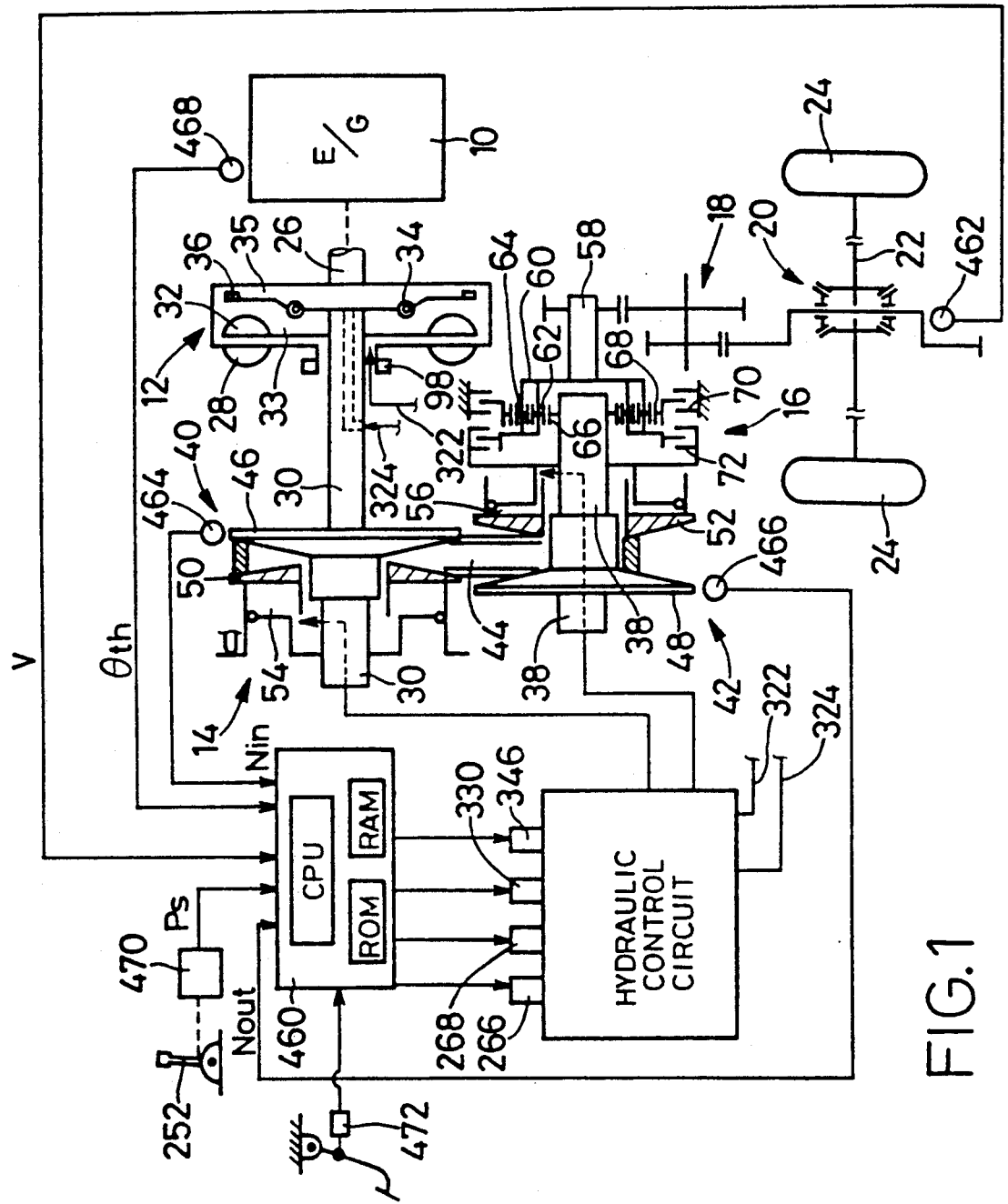
FIG. 1 is a schematic view of a vehicle power transmitting system equipped with a hydraulic control apparatus constructed according to one embodiment of the present invention to control a continuously variable transmission used in the system.

Referring first to FIG. 1, there is illustrated a power transmitting system of an automotive vehicle, for transmitting power from an engine 10 to front drive wheels 24, 24. The power transmitting system includes: a fluid coupling 12 connected to the engine 10 through a crankshaft 26 and equipped with a lock-up clutch 36; a continuously variable transmission (hereinafter referred to as «CVT") 14 connected to the fluid coupling 12; a reversing device 16 connected to the CVT 14, for selecting a forward or a reverse running of the vehicle; an intermediate gear device 18 connected to the reversing device 16; a differential gear device 20 connected to the intermediate gear device 18; and a drive axle 22 connected to the differential gear device 20 and drive wheels 24.

The fluid coupling 12 includes a pump impeller 28 connected to the crankshaft 26 of the engine 10; a turbine impeller 32 which is fixed to an input shaft 30 of the CVT 14 and rotated by means of a working fluid from the pump impeller 28; the lock-up clutch 36 indicated above, which is fixed to the input shaft 30 through a damper 34; and means for defining an engaging chamber 33 communicating with an engaging line 322 (which will be described), and a releasing chamber 35 communicating with a releasing line 324 (which will be described). The fluid coupling 12, which is filled with the working fluid, is operated to effect engagement of the lock-up clutch 36 for direct connection of the crankshaft 26 to the input shaft 30, when the speed of the vehicle, engine 10 or pump impeller 28, for example, exceeds a predetermined value. In this case, the fluid is fed into the engaging chamber 33 while the fluid in the releasing chamber 35 is discharged. When the vehicle speed or other speed indicated above falls below the predetermined value, on the other hand, the lock-up clutch 36 is disengaged or released such that the fluid is fed into the releasing chamber 35 and discharged from the engaging chamber 33.

The CVT 14 has a pair of variable-diameter pulleys 40, 42 having a same diameter which are provided on the input shaft 30 and an output shaft 38, respectively. These pulleys 40, 42 are connected by a transmission belt 44, and have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, whereby the effective widths of V grooves of the pulleys 40, 42, i.e., the effective diameters engaging the belt 44 are changed, to control a speed ratio «e" of the CVT 14 (Nout/Nin, where Nout=speed of the output shaft 38, and Nin=speed of the input shaft 30).

Since the variable-diameter pulleys 40, 42 have the same diameter, the corresponding first and second hydraulic cylinders 54, 56 have a same pressure-receiving surface area. Generally, the tension of the transmission belt 44 is determined primarily by the pressure in one (hereinafter referred to as «driven side cylinder") of the first and second hydraulic cylinders 54, 56 which corresponds to the driven one of the pulleys 40, 42 (hereinafter referred to as «driven side pulley"). The driven side cylinder 54 or 56 is supplied with a second line pressure Pl2 which is adjusted by a second pressure regulating valve 102 (which will be described), whereby the tension of the belt 44 is adjusted to within an optimum range in which the belt 44 does not slip on the pulleys 40, 42.

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which meshes with the inner planetary gear 62; a ring gear 68 meshing with the outer planetary gear 64; a REVERSE brake 70 for inhibiting the rotation of the ring gear 68; and a FORWARD clutch 72 for connecting the carrier 60 and the input shaft 38.

The REVERSE brake 70 and FORWARD clutch 72 are hydraulically operated, frictionally coupling devices. The reversing device 16 is placed in a neutral position thereof when the brake 70 and the clutch 72 are both in the disengaged or released positions. In this state, the reversing device 16 does not transmit power to the intermediate gear device 18. When the FORWARD clutch 72 is engaged, the output shaft 38 (input shaft of the device 16) of the CVT 14 and the output shaft 58 of the device 16 are connected to each other, whereby power is transmitted from the CVT 14 to the intermediate gear device 18, so as to run the vehicle in the forward direction. When the REVERSE brake 70 is engaged, on the other hand, the direction of rotation of the output shaft 58 of the reversing device 16 is reversed with respect to the direction of rotation of the output shaft 38 of the CVT 14, whereby power is transmitted so as to run the vehicle in the reverse direction.

Figure 2:
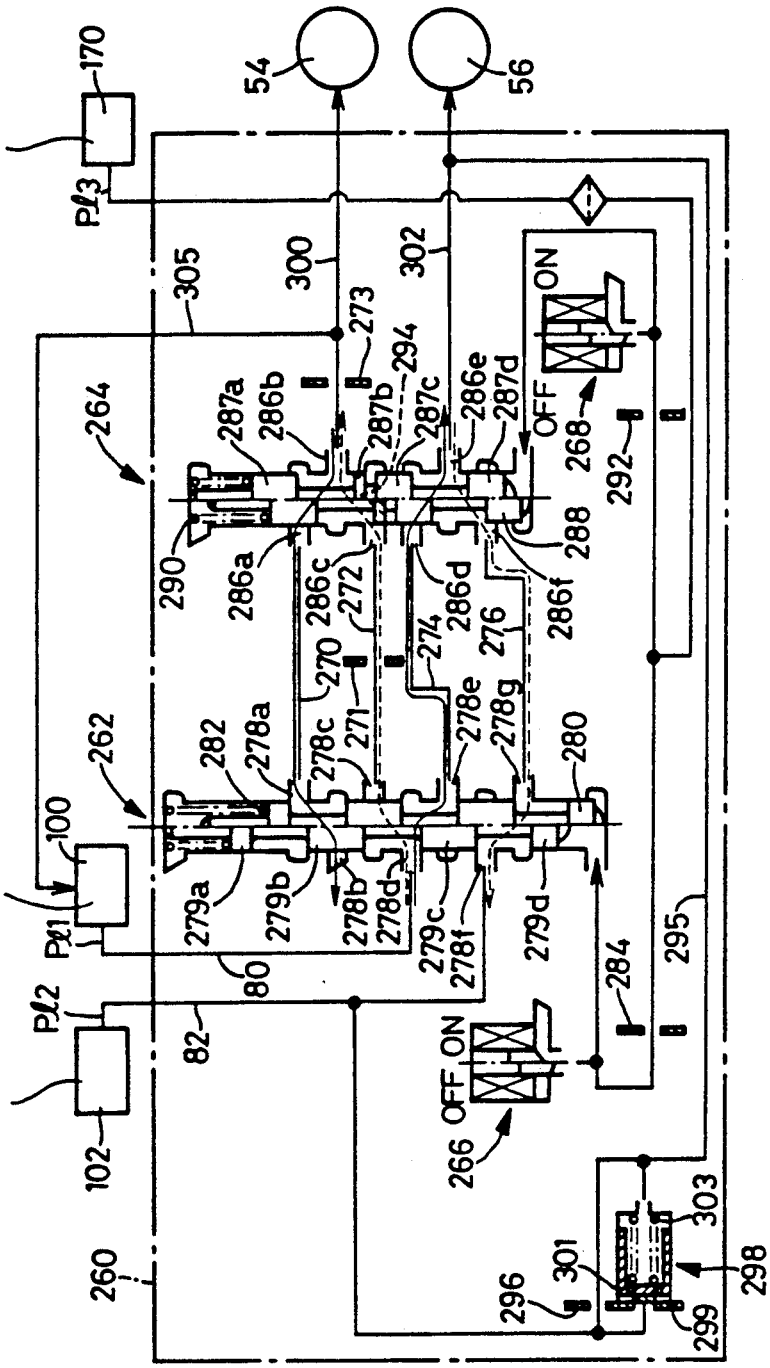
FIG. 2 is a view of a portion of a hydraulic control circuit of the control apparatus of FIG. 1, showing in detail a shift control valve assembly incorporated therein.

The hydraulically operated power transmitting system described above is controlled by a hydraulic control circuit indicated generally at 450 in FIG. 1 which is similar to a circuit as disclosed in related U.S. patent application (no Serial Number accorded yet) filed Feb. 7, 1990 (corresponding to Japanese Patent Application No. 1-33141) assigned to the assignee of the present application, and in U.S. Pat. No. 4,867,732. The hydraulic control circuit incorporates a shift control valve assembly 260 as illustrated in FIG. 2, for controlling the speed ratio «e" of the CVT 14.

In the shift control valve assembly 260, the pressurized fluid produced by an oil pump 98 is regulated by a first pressure regulating valve 100, and delivered as a first line pressure Pl1 into a first pressure line 80. The first line pressure Pl1 is lowered by the above-indicated second pressure regulating valve 102, to produce the above-indicated second line pressure Pl2 in a second pressure line 82, which is lower by a suitable amount than the first line pressure. The first and second line pressures Pl1 and Pl2 are applied to one and the other of the first and second hydraulic cylinders 54, 56 through the shift control valve assembly 260, for controlling the speed ratio ee" of the CVT 14. The shift control valve assembly 260 includes a directional control valve 262 and a flow control valve 264. These control valves 262, 264 receive a pilot pressure in the form of a third line pressure Pl3 which is generated by a third pressure regulating valve 170 based on the first line pressure Pl1.

The directional control valve 262 is a spool valve controlled by a first solenoid-operated valve 266. The valve 262 has ports 278a, 278c, 278e and 278g which communicate with respective first, second, third and fourth connecting lines 270, 272, 274 and 276 that are connected to the flow control valve 264. The line 272 is provided with a first flow restrictor 271. The directional control valve 262 further has a drain port 278b communicating with the drain, a port 278d communicating with the first pressure line 80 to receive the first line pressure P(1, and a port 278f communicating with the second pressure line 82 to receive the second line pressure Pl2. The valve 262 includes a valve spool 280 which is axially slidably movable between a first position corresponding to one end (upper end as viewed in FIG. 2) of an operating stroke thereof, and a second position corresponding to the other end (lower end as viewed in FIG. 2) of the operating stroke. The spool 280 is biased by a spring 282 toward its second position.

The valve spool 280 has four lands 279a, 279b, 279c and 279d which open and close the above-indicated ports of the valve 262. The upper end of the spool 280 on the side of the spring 282 is exposed to the atmosphere, with no hydraulic pressure applied thereto. On the other hand, the lower end of the spool 280 is exposed to the third line pressure Pl3 when the first solenoid-operated valve 266 is placed in the OFF or closed position. With the valve 266 placed in the ON or open position, however, the third line pressure Pl3 is released through the valve 266 located downstream of a flow restrictor 284, whereby the third line pressure Pl3 is not applied to the lower end of the valve spool 280. In this arrangement, while the first solenoid-operated valve 266 is ON, the spool 280 is placed in its second position. In this state, the ports 278a and 278b are connected to each other and the ports 278d and 278e are connected to each other, while the ports 278d and 278c are disconnected from each other and the ports 278f and 278g are disconnected from each other. While the solenoid-operated valve 266 is OFF, the spool 280 is placed in the first position, whereby the ports 278a and 278b are disconnected and the ports 278d and 278e are disconnected, while the ports 278d and 278c are connected and the ports 278f and 278g are connected.

The flow control valve 264 of the shift control valve assembly 260 is a spool valve controlled by a second solenoid-operated valve 268. The valve 264 has ports 286a, 286c, 286d and 286f which communicate with the above-indicated first, second, third and fourth connecting lines 270, 272, 274 and 276. The flow control valve 264 further has a port 286b communicating with the first hydraulic cylinder 54, and a port 286e communicating with the second hydraulic cylinder 56. The valve 264 includes a valve spool 288 which is axially slidably movable between a first position on the side of one end (upper end as viewed in FIG. 2) of an operating stroke thereof, and a second position on the side of the other end (lower end as viewed in FIG. 2) of the operating stroke. The spool 288 is biased by a spring 290 toward its second position.

The valve spool 288 has four lands 287a, 287b, 287c and 287d which open and close the above-indicated ports of the valve 264. The two lands 287b and 287c functionally serve as a single land divided into two portions for defining a flow restrictor 294. In this respect, the valve spool 288 is considered to have three functionally different lands 287a, 287b-287c and 287d. As in the valve 262, the upper end of the spool 288 on the side of the spring 290 is exposed to the atmospheric pressure, with no hydraulic pressure applied thereto. On the other hand, the lower end of the spool 288 is exposed to the third line pressure Pl3 when the second solenoid-operated valve 268 is placed in the OFF or closed position. With the valve 268 placed in the ON or open position, however, the third line pressure Pl3 is released through the valve 268 located downstream of a flow restrictor 292, whereby the third line pressure Pl3 is not applied to the lower end of the valve spool 288. In this arrangement, while the second solenoid-operated valve 268 is ON (with the duty cycle set at 100%), the spool 288 is placed in its second position. In this state, the ports 286c and 286b are connected to each other and the ports 286f and 286e are connected to each other, while the ports 286a and 286b are disconnected from each other and the ports 286d and 286e are disconnected from each other. While the solenoid-operated valve 286 is OFF (with the duty cycle set at 0%), the spool 288 is placed in the first position, whereby the ports 286c and 286b are disconnected and the ports 286f and 286e are disconnected, while the ports 286a and 286b are connected and the ports 286d and 286e are connected.

While the second solenoid-operated valve 268 is OFF, the ports 286c and 286b are held in restricted communication with each other through the flow restrictor 294. The second hydraulic cylinder 56 communicates with the second pressure line 82 through a flow restrictor 296 and a check valve 298 which are connected in parallel. These restrictor and check valve 296, 298 are provided to prevent a rapid decrease in the pressure Pout (=Pl1) in the second hydraulic cylinder 56 with the fluid being discharged from the cylinder 56 into the second pressure line 82, when the first line pressure Pl1 is applied to the cylinder 56, during a shift-down operation of the CVT 14 which requires the pressure Pout to be higher than the pressure Pin in the first cylinder 54, or during an engine-braking operation in which torque is transmitted in the direction from the output shaft 38 of the CVT 14 to the input shaft 30.

When the first solenoid-operated valve 266 is turned ON, the pressurized fluid in the first pressure line 80 is fed into the second cylinder 56 through the port 278d, port 278e and a third connecting line 274, port 286d, port 286e and second cylinder line 302, as indicated in solid line in FIG. 2, while the fluid in the first cylinder 54 is discharged to the drain through a first cylinder line 300 and the port 286b, port 286a, first connecting line 270, port 278a and port 278b, as also indicated in solid line in FIG. 2. As a result, the speed ratio ee" of the CVT 14 is reduced so as to reduce the speed of the vehicle, i.e., the CVT 14 is shifted down. The CVT 14 is slowly shifted down in a SLOW SHIFT-DOWN mode III as indicated in FIG. 14 while the second solenoid-operated valve 268 is ON, and the CVT 14 is rapidly shifted down in a RAPID SHIFT-DOWN mode I as also indicated in FIG. 14 while the second solenoid-operated valve 268 is OFF.

When the first solenoid-operated valve 266 is turned OFF, the pressurized fluid in the first pressure line 80 is fed into the first cylinder 54 through the port 278d, port 278c, second connecting line 272, port 286c, port 286b and first cylinder line 300, as indicated in broken line in FIG. 2, while the fluid in the second cylinder 56 is discharged to the second pressure line 82 through the second cylinder line 302, port 286e, port 286f, fourth connecting line 276, port 278g and port 278f, as also indicated in broken line in FIG. 2. As a result, the speed ratio "e" of the CVT 14 is increased so as to increase the speed of the vehicle, i.e., the CVT 14 is shifted up. The CVT 14 is slowly shifted up in a SLOW SHIFT-UP mode IV as indicated in FIG. 14 while the second solenoid-operated valve 268 is OFF, and the CVT 14 is rapidly shifted up in a RAPID SHIFT-UP mode VI while the valve 268 is ON. A second flow restrictor 273 is provided between the port 286b of the flow control valve 264 and a connecting point between the first cylinder line 300 and a branch line 305 leading to the first pressure regulating valve 100.

Figure 14:
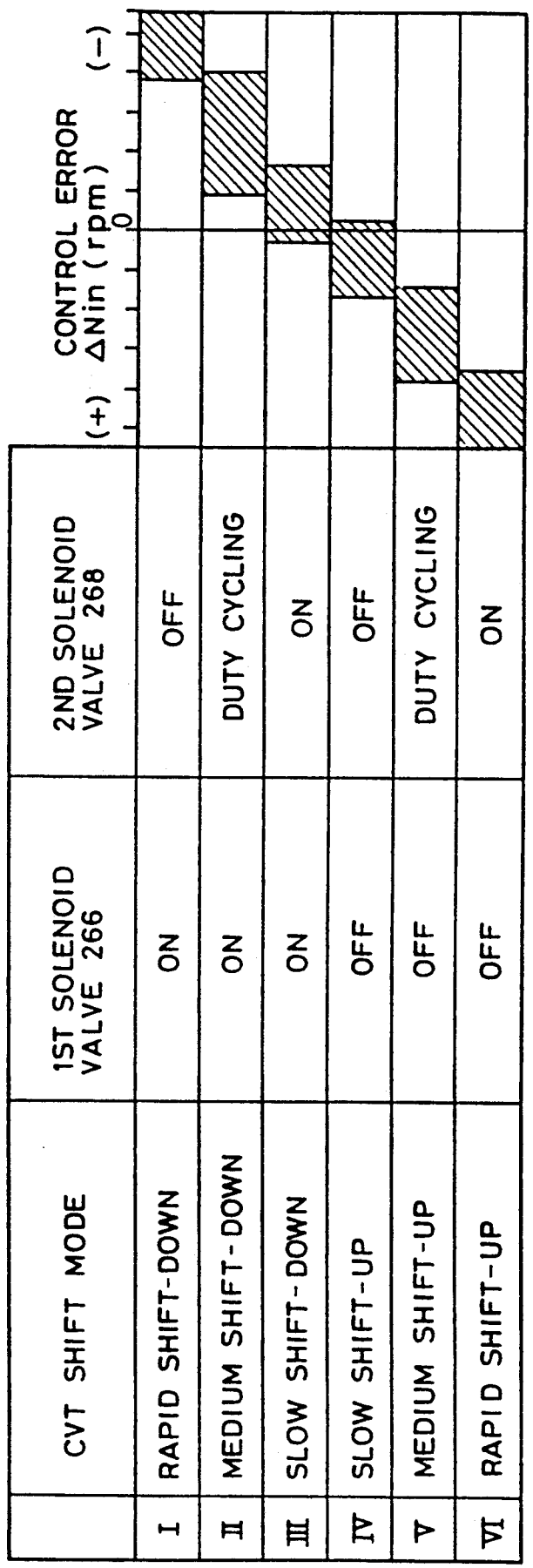
FIG. 14 is a view indicating a relationship between on-off states of a first and a second valve of the valve assembly of FIG. 2, and a shifting mode of the continuously variable transmission.

The CVT 14 has six shift modes including the above-indicated modes I, III, IV and VI, which are established by respective combinations of the operating states (ON, OFF and DUTY CYCLING states) of the first and second solenoid-operated valves 266 and 268, as indicated in FIG. 14. The six shift modes have different shifting directions and different rates of change in the speed ratio "e". The shift mode IV is established when both of the first and second solenoid-operated valves 266, 268 are OFF. In this shift mode IV, the pressurized fluid in the first pressure line 80 is fed into the first cylinder 54 through a flow restrictor 294 formed through the valve spool 288 of the flow control valve 264, while the fluid in the second cylinder 56 is discharged at a relatively low rate into the second pressure line 82 through the flow restrictor 296. The shift mode III is established when the first and second solenoid-operated valves 266, 268 are both ON. In this mode III, the fluid in the second pressure line 82 is fed into the second cylinder 56 through a flow restrictor 296 provided in the by-pass line 295, and through the check valve 298. The flow restrictor 296 and check valve 298 are disposed in parallel with each other. At the same time, the fluid in the first cylinder 54 is discharged at a relatively low rate through a small clearance which is purposely or inherently formed or provided between the piston and the mating sliding surface of the cylinder 54.

Figure 13:
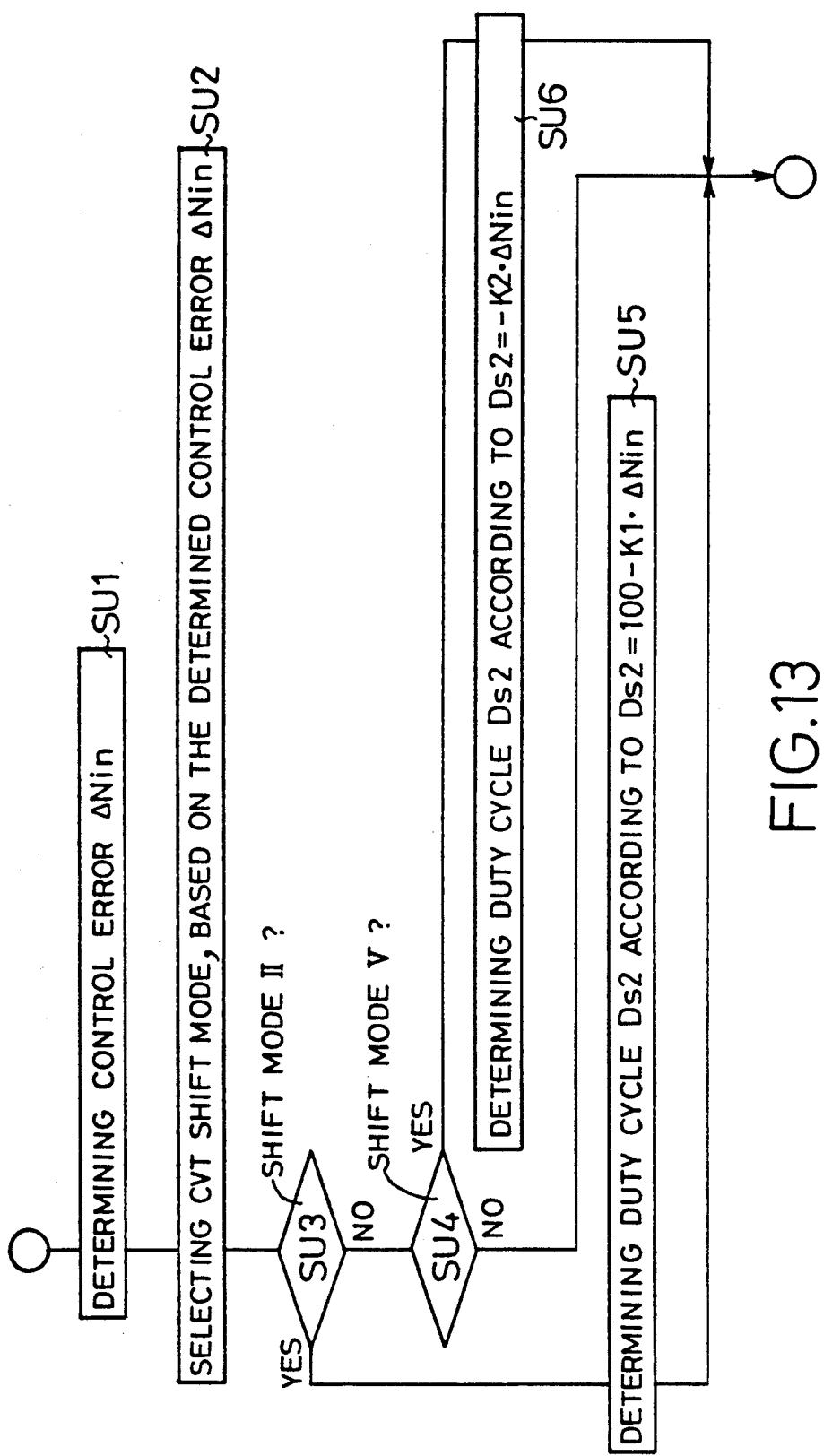
FIG. 13 is a flow chart illustrating a speed-ratio feedback mode of operation of the continuously variable transmission in the embodiment of FIG. 12.

As described later by reference to FIGS. 12 and 13 with respect to a modified embodiment of the invention, the CVT 14 is shifted in the MEDIUM SHIFT-DOWN mode II, by controlling the duty cycle Ds2 of the second solenoid-operated valve 268, with the first solenoid-operated valve 266 held ON. On the other hand, the CVT 14 is shifted in the MEDIUM SHIFT-UP mode V, by controlling the duty cycle Ds2 with the first solenoid-operated valve 266 held OFF.

The by-pass line 295 provided between the second cylinder 56 and the second pressure line 82 as described above effectively prevents or minimizes a phenomenon of pulsation of the pressure Pout in the second cylinder 56 which would occur in synchronization with the duty cycling operation of the flow control valve 264. More specifically, the upper peak of the spike of the pressure Pout is released through the flow restrictor 296, while the lower peak of the pressure Pout is compensated for by the check valve 298. The check valve 298 includes a valve seat 299 having a flat seat surface, a valve member 301 having a flat operating surface which is abutable on the valve seat 299, and a spring 303 for biasing the valve member 301 against the seat 299. This check valve 298 is adapted to be opened when a pressure difference across the valve exceeds about 0.2 kg/cm$^2$.

Referring back to FIG. 1, there is indicated an electronic control device 460, which serves as control means for controlling the hydraulic control circuit 450. More specifically, control device 460 controls the first and second solenoid-operated valves 266, 268 for the directional and flow control valves 262, 264 for regulating the speed ratio "e" of the CVT 14, a third and a fourth solenoid-operated valve 330, 346 for controlling the lock-up clutch 36, and the other elements of the power transmitting system of the vehicle. The electronic control device 460 includes a so-called microcomputer which incorporates a central processing unit (CPU), a random-access memory (RAM) and a read-only memory (ROM), as well known in the art.

The control device 460 receives various signals from various sensors and switches, such as: a VEHICLE speed sensor 462 disposed to detect the rotating speed of the drive wheels 24, and generating a vehicle speed signal representative of the detected speed, i.e., a running speed "e" of the vehicle; an INPUT SHAFT speed sensor 464 disposed to detect the rotating speed of the input shaft 30 of the CVT 14, and generating an input shaft speed signal representative of the detected speed Nin of the input shaft 30; an OUTPUT SHAFT speed sensor 466 disposed to detect the speed of the output shaft 38 of the CVT 14, and generating an output shaft speed signal representative of the detected speed Nout of the output shaft 38; a THROTTLE sensor 468 disposed to detect an angle of opening of the throttle valve disposed in a suction pipe of the engine 10, and generating a throttle signal representative of the opening angle $\theta$th of the throttle valve; a SHIFT LEVER sensor 470 disposed to detect the currently selected operating position of the shift lever 252, and generating a signal representative of the currently selected position Ps of the shift lever 252; and a BRAKE switch 472 disposed to detect an operation of a brake pedal of the vehicle, and generating a signal indicative of the operation of the brake pedal. The CPU of the electronic control device 460 processes these input signals according to control programs stored in the ROM, while utilizing a temporary data storage function of the RAM, and applies appropriate drive or control signals to the first, second, third and fourth solenoid-operated valves 266, 268, 330 and 346.

Figure 3:
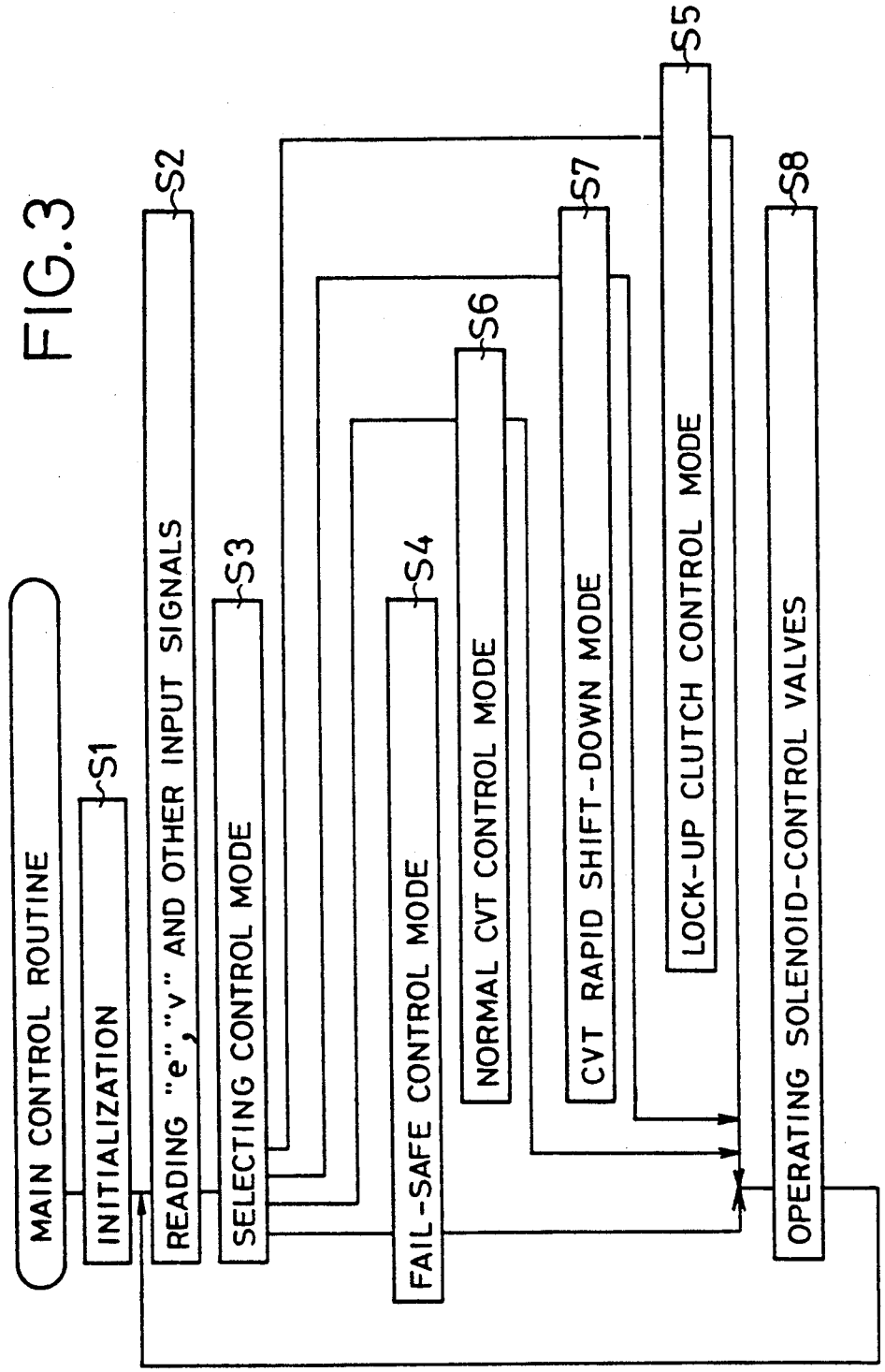
FIG. 3 is a flow chart illustrating a main control routine implemented by the control apparatus of FIG. 1.

Upon application of power to the control device 460, main control routine as illustrated in FIG. 3 is executed. Initially, step S1 is implemented to initialize the control device 460. Then, the control flow goes to step S2 to calculate the vehicle running speed "e" (speed of the drive wheels 24), speeds Nin and Nout of the input and output shafts 30, 38, and speed ratio "e" of the CVT 14, based on the input signals received from the various sensors indicated above. The VEHICLE speed sensor 462 and a portion of the control device 460 assigned to execute step S2 constitute means for detecting the vehicle running speed "e". Step S2 is followed by step S3 to select an appropriate one of four control modes, based on the received input signals. The control modes consist of: a FAIL-SAFE CONTROL mode; a LOCK-UP CLUTCH CONTROL mode for controlling the lock-up clutch 36; a NORMAL CVT CONTROL mode for normally controlling the speed ratio "e" of the CVT 14; and a CVT RAPID SHIFT-DOWN mode for controlling the CVT 14 upon application of a sudden or abrupt braking to the vehicle. Step S3 is followed by one of steps S4–S7, according to the selected control mode, to control the power transmitting system in the selected control mode. In the next step S8, control signals are applied to the first, second, third and fourth solenoid-operated valves 266, 268, 330, 346, as a result of an operation in the selected control mode in step S4, S5, S6 or S7. The control flow then goes back to steps S2 and S3 to perform the next required mode of operation in one of steps S4–S7.

The FAIL-SAFE CONTROL mode is selected when any input signal received by the control device 460 is abnormal. The LOCK-UP CLUTCH CONTROL mode is established to release the lock-up clutch 36, when the shift lever 252 is operated to a parking position P or a neutral position N, or when the vehicle running speed "v" falls below a predetermined lower limit. In the NORMAL CVT CONTROL mode, a desired or optimum speed Nin* of the input shaft 30 (desired speed of the engine 10) is determined based on the detected opening angle $\theta$th of the throttle valve and the detected vehicle running speed "v", according to a predetermined relationship among these parameters, so that the engine 10 is operated under an optimum condition in terms of the fuel economy and drivability of the vehicle. The speed ratio "e" of the CVT 14 is controlled in a feedback manner, by controlling the solenoid-operated valves 266 and 268, so that the actually detected speed Nin of the input shaft 30 coincides with the determined desired or optimum speed Nin*.

Figure 4:
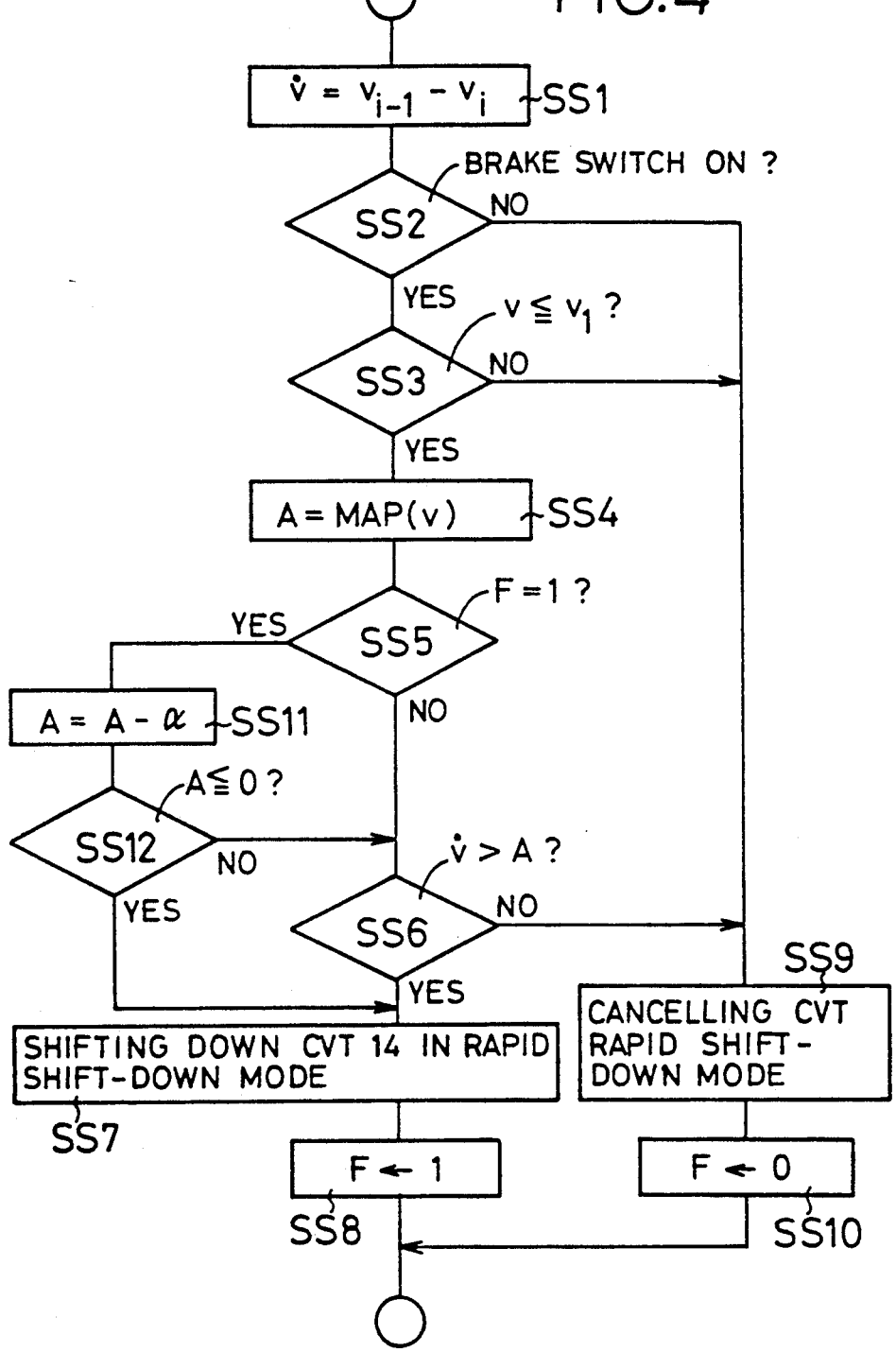
FIG. 4 is a flow chart illustrating part of the main control routine of FIG. 3.

The CVT RAPID SHIFT-DOWN mode is selected when an abrupt brake is applied to the vehicle. In this control mode, the CVT 14 is shifted down to the position of the lowest speed ratio "e" before the vehicle is stopped, so that the vehicle can be smoothly or easily re-started. The CVT RAPID SHIFT-DOWN mode of operation is performed as illustrated in the flow chart of FIG. 4, for example. Initially, step SS1 is implemented to calculate a deceleration value $\dot{v}$ of the vehicle, according to the following equation (1), namely, by subtracting the vehicle speed $v_i$ detected in the current control cycle, from the vehicle speed $v_{i-1}$ detected in the preceding control cycle.

$$\dot{v} = v_{i-1} - v_i \ldots \quad (1)$$

The deceleration value $\dot{v}$ is positive when the vehicle is decelerated. The VEHICLE speed sensor 462 and a portion of the control device 460 assigned to execute step SS1 constitute means for detecting the deceleration value of the vehicle.

Then, the control flow goes to step SS2 to determine whether the BRAKE switch 472 is ON or not. This determination is effected based on the signal from the switch 472. If a negative decision (NO) is obtained in step SS2, the control flow goes to step SS9 to cancel the CVT RAPID SHIFT-DOWN mode. Step SS9 is followed by step SS10 in which a flag "F" is reset to zero, and the control flow returns to the main control routine of FIG. 3. If the BRAKE switch 472 is ON, an affirmative decision (YES) is obtained in step SS2, whereby step SS3 is executed to determine whether the currently detected vehicle speed "v" is equal to or lower than a threshold value $v_1$ stored in the ROM of the control device 460. This threshold value $v_1$ is a lower limit above which the speed ratio "e" of the CVT 14 can be sufficiently lowered toward the lowest value, without controlling the CVT 14 in the CVT RAPID SHIFT-DOWN mode. For instance, the reference value $v_1$ is in the neighborhood of 50 km/h.

Figure 5:
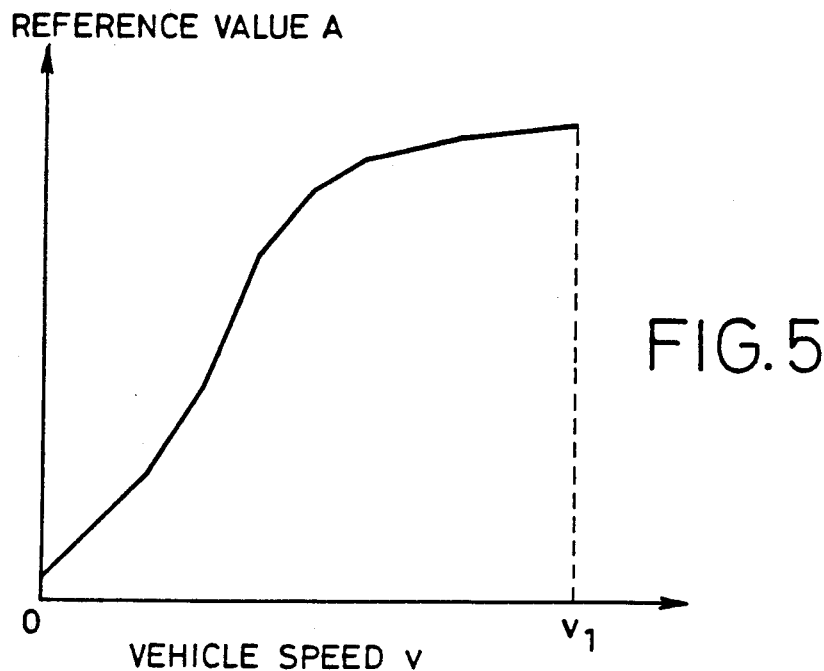
FIG. 5 is a graph indicating a relationship between a reference value and a vehicle speed, used in the control routine of FIG. 4.

If the detected vehicle running speed "v" is higher than the threshold value $v_1$, the control flow goes to step SS9 described above. If the vehicle speed "v" is equal to or lower than the threshold value $v_1$, step SS4 is implemented to determine a reference value A for the vehicle deceleration value $\dot{v}$, based on the vehicle speed "v", according to a relationship A = MAP (v) between the value A and the speed "v", which relationship is stored in the ROM. This relationship is experimentally determined for the varying vehicle speed "v", so that the reference value A is the minimum deceleration value of the vehicle above which the CVT 14 can be shifted down toward the position of the lowest speed ratio "e" during brake application to the vehicle, without giving the vehicle operator a feeling that an engine braking is applied to the vehicle. An example of the relationship is represented by a curve of FIG. 5, which is stored as a data map in the ROM of the control device 460.

Step SS4 is followed by step SS5 to determine whether the flag "F" is "1" or not. If a negative decision (NO) is obtained in step SS5, that is, if the CVT 14 is not in the process of being shifted down in the CVT RAPID SHIFT-DOWN mode, step SS6 is implemented to determine whether the deceleration value $\dot{v}$ is larger than the reference value A, or not. If an affirmative decision (YES) is obtained in step SS5, that is, if the CVT 14 is in the process of being shifted down in the CVT RAPID SHIFT-DOWN mode, step SS5 is followed by step SS11 in which a hysteresis value $\alpha$ is subtracted from the reference value A. Then, the control flow goes to step SS12 to determine whether the reference value A is equal to or smaller than zero (0), or not. If a negative decision (NO) is obtained in step SS12, that is, if the reference value A is now positive, step SS6 is implemented. If an affirmative decision (YES) is obtained in step SS12, that is, if the reference value A is equal to zero or negative, the control flow goes to step SS7, skipping step SS6. If step SS7 is implemented for the first time, the first and second solenoid-operated valves 266 and 768 are turned ON and OFF, respectively, to shift down the CVT 14, irrespective of the currently effective optimum speed ratio "e". If the CVT 14 is in the process of being shifted down, that is, if step SS7 is executed after an affirmative decision (YES) is obtained in step SS5, a shift-down operation of the CVT 14 is continued, with the valves 266, 268 kept in the ON and OFF positions, respectively. Step SS7 is followed by step SS8 to set the flag "F" to "1".

In the present embodiment of the control apparatus of the invention, the reference deceleration value A below which the CVT 14 can be shifted down without a feeling of an engine brake applied to the vehicle is determined for the detected vehicle speed "v", according to the predetermined relation A = MAP (v) between the reference value A and the vehicle speed "v". The CVT 14 is commanded to be shifted down toward the position of the lowest speed ratio "e", if the detected deceleration value $\dot{v}$ exceeds the reference value A (steps SS6 and SS7). This reference value A is referred to as "first deceleration reference value"). In the present arrangement, the CVT 14 is smoothly and rapidly shifted down to establish the lowest speed ratio "e", upon brake application, without giving the feeling of engine brake application, and without deteriorating the driving comfort of the vehicle.

Figure 6:
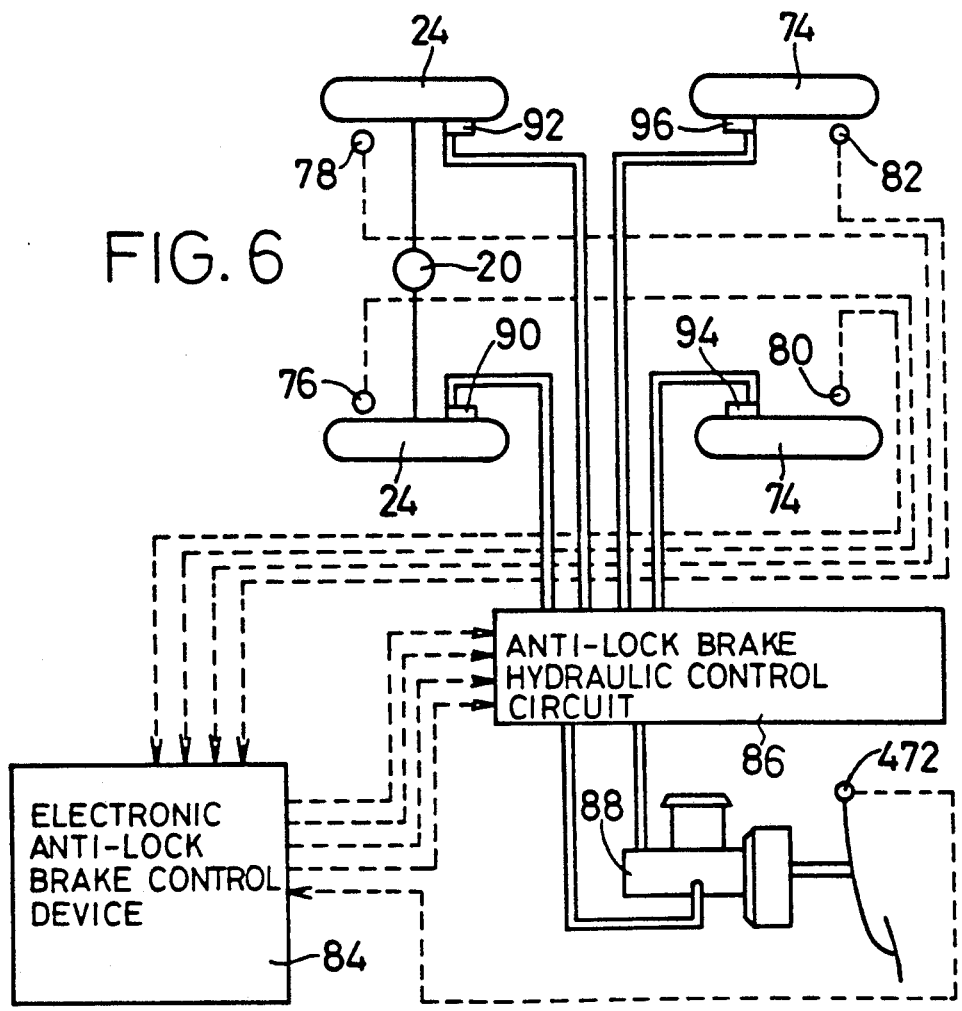
FIG. 6 is a schematic view showing an anti-lock braking system used with another embodiment of the present invention.
Figure 7:
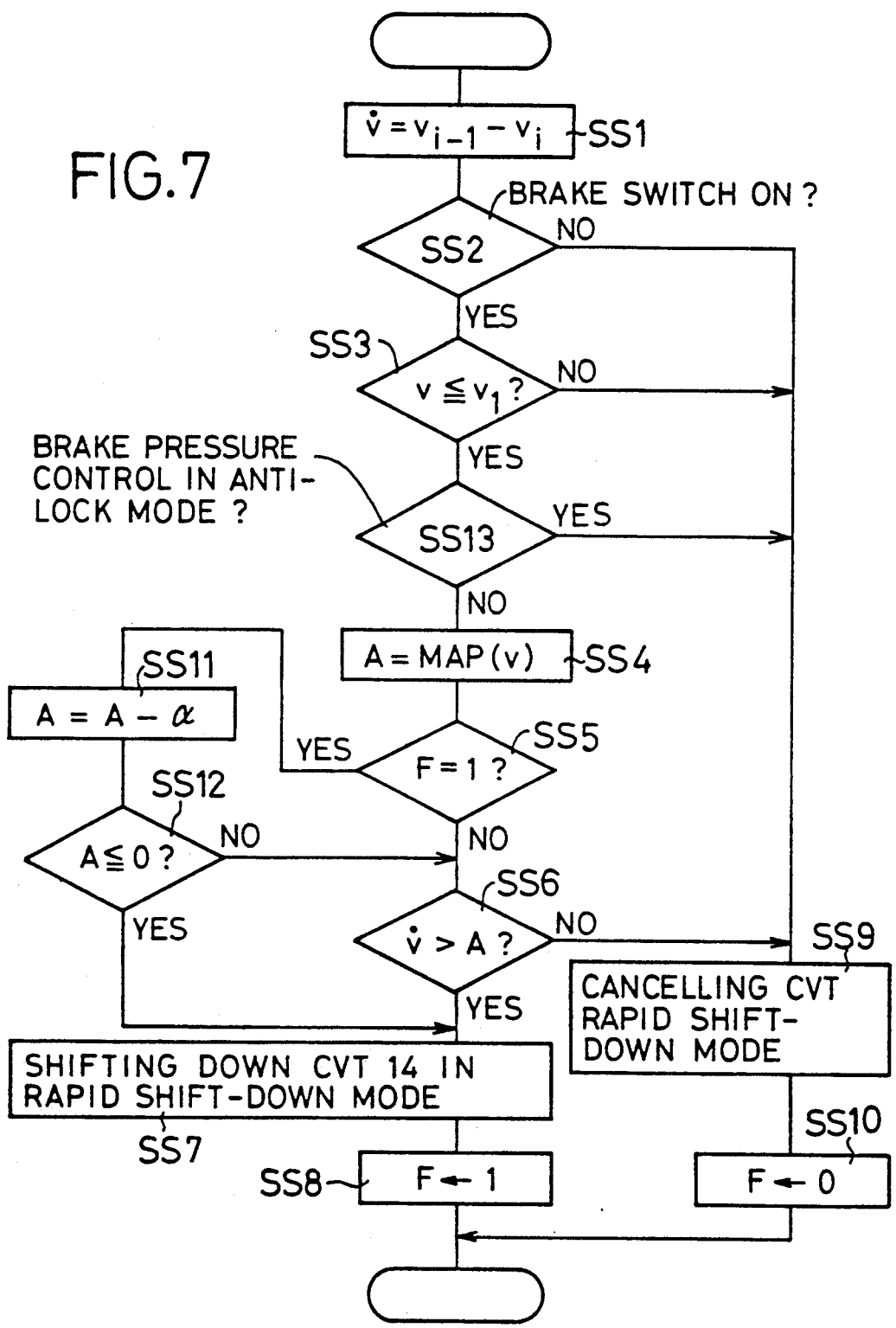
FIG. 7 is a flow chart corresponding to that of FIG. 4, illustrating an operation of the embodiment of FIG. 6.

Referring next to FIGS. 6 and 7, there will be another embodiment of the present invention adapted to control the CVT 14, in response to an operation of an anti-lock braking system provided for the vehicle. In this embodiment, the same reference numerals as used in the first embodiment will be used to identify the corresponding components, and a redundant description thereof will not be provided.

The anti-lock braking system is illustrated in FIG. 6, which is adapted to automatically control the braking pressures applied to the front drive wheels 24 and rear wheels 74 upon brake application to the vehicle, so that the slip ratios of the wheels 24, 74 are held within an optimum range, so as to maintain the coefficient of friction of the wheels with respect to the road surface and the cornering force of the wheels above predetermined lower limits. The anti-lock braking system includes speed sensors 76, 78, 80 and 82 for detecting the speeds of the front and rear wheels 24, 24, 74, 74, respectively. Signals generated by these speed sensors 76, 78, 80, 82 are applied to an electronic anti-lock brake control device 84 which incorporates an arithmetic circuit. This brake control device 84 also receives a signal from the BRAKE switch 472. The brake control device 84 includes a microcomputer incorporating input and output circuits, a central processing unit (CPU), a read-only memory (ROM) and a random-access memory (RAM). The CPU processes the input signals according to control programs stored in the ROM, while utilizing a temporary data storage function of the RAM. For example, the CPU of the brake control device 84 calculates a presumed running speed VS$\Phi$ of the vehicle, and calculates a slip ratio of each wheel 24, 74 based on the actually detected wheel speed and a wheel speed which corresponds to the presumed vehicle speed VS$\Phi$. The brake control device 84 controls an anti-lock brake hydraulic control circuit 86, so that the calculated slip ratio of each wheel is held within the optimum range. As well known in the art, the anti-lock brake hydraulic control circuit 86 is provided with an oil pump, a damper, a reservoir and suitable control valves, and is disposed between a master cylinder 88 and wheel cylinders 90, 92, 94, 96. In response to the signals from the anti-lock brake control device 84, the hydraulic control circuit 86 increases, decreases or maintain the fluid pressure to be applied to each of the wheel cylinders 90, 92, 94, 96 for maintaining the slip ratio of each wheel 24, 74 within the optimum range.

Upon application of an abrupt brake to the vehicle, the electronic anti-lock brake control device 84 commands the hydraulic control circuit 86 to regulate the pressures to the wheel cylinders 90, 92, 94, 96 so that the actually detected drive wheel speed VW follows a desired or target vehicle speed VSL corresponding to the presumed vehicle speed VS$\Phi$. The drive wheel speed VW is the lower one of the detected speeds VWFL and VWFR of the front left and front right drive wheels 24, 24. The presumed vehicle speed VS$\Phi$ is the speed of the least slipping one of the four wheels 24, 74, and the target vehicle speed VSL is a difference by subtracting the presumed vehicle speed VS$\Phi$ multiplied by a desired slip ratio (e.g., 0.2), from the presumed vehicle speed VS$\Phi$.

The flow chart of FIG. 7 illustrates an operation of the electronic control device 460 of the power transmitting system of FIG. 1 of the vehicle, where the vehicle is equipped with the anti-lock braking system of FIG. 6. The flow chart of FIG. 7 is similar to that of FIG. 4 of the preceding embodiment, but is different therefrom in that step SS13 is provided between steps SS3 and SS4, to determine whether the braking pressure in any one of the wheel cylinders 90, 92, 94, 96 is in the process of being controlled in the anti-lock mode, or not. This determination is effected based on a signal from the anti-lock brake control device 84. If the anti-lock brake hydraulic control circuit 86 is not controlling the braking pressure in any one of the wheel cylinders 90, 92, 94, 96 in the anti-lock mode, the control flow goes to step SS4 and the subsequent steps. If the control circuit 86 is operating to control the braking pressure in the anti-lock mode, the control flow goes to step SS9 to cancel the CVT RAPID SHIFT-DOWN mode.

In the present embodiment, the CVT 14 is shifted down in the CVT RAPID SHIFT-DOWN mode in step SS7 if an affirmative decision (YES) is obtained in step SS6, while the anti-lock brake hydraulic control circuit 86 is not operating to effect the anti-lock control of the braking pressure in any one of the wheel cylinders so as to prevent an excessive amount of slip of the corresponding wheel. If the hydraulic control circuit 86 is operating to control the braking pressure in the anti-lock mode, however, the electronic control device 460 will not command the hydraulic control circuit 450 of the power transmitting system to effect step SS7 of the flow chart of FIG. 7, regardless of whether the vehicle deceleration value $\dot{v}$ exceeds the first deceleration reference value A, or not. Namely, if the operation in the CVT RAPID SHIFT-DOWN mode in step SS7 was effected while the braking pressure in any one of the wheel cylinders 90, 92, 94, 96 is being lowered so as to prevent an excessive slip of the corresponding wheel, the amount of slip of that wheel would not be effectively reduced, due to the engine-braking effect caused by the shift-down action of the CVT 14 in step SS7. Thus, the present arrangement permits the anti-lock brake control device 84 to be operated in the intended manner so as to maintain the slip ratio of each wheel within the optimum range, upon application of brake to the vehicle.

It is noted that the anti-lock brake pressure control which involves reduction in the braking pressure results in increasing the braking distance of the vehicle, whereby a relatively long time is provided for the CVT 14 to be shifted down to the position of the lowest speed ratio "e" before the vehicle is brought to a stop. Further, the activation of the anti-lock brake control device 84 indicates a relatively low coefficient of friction of the road surface, and the vehicle can be comparatively easily re-started, even if the CVT 14 has not been shifted down to the position of the lowest speed ratio before the vehicle is stopped.

Figure 8:
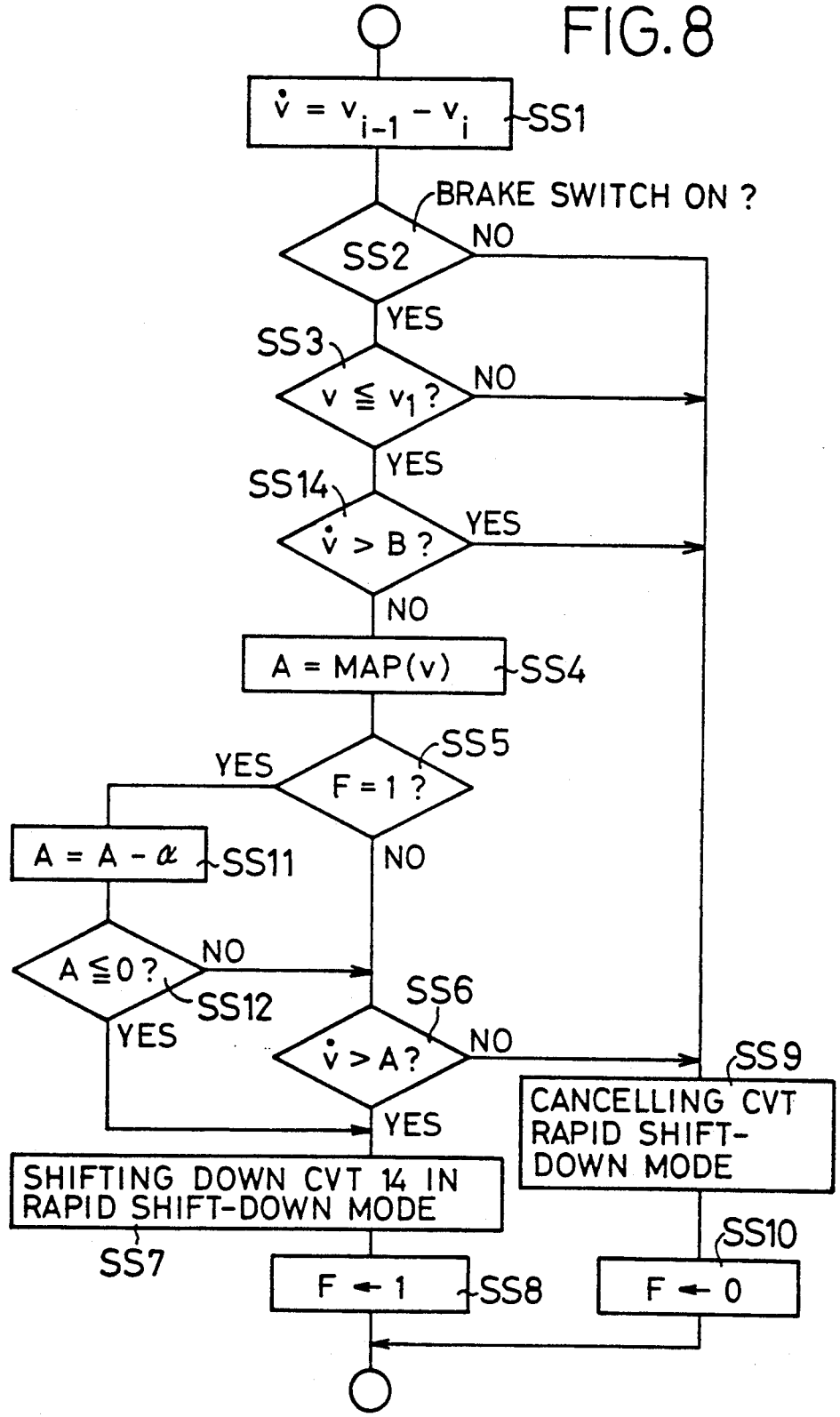
FIG. 8 is a flow chart also corresponding to that of FIG. 4, illustrating a modified form of operation alternative to that of FIG. 7.
Figure 9:
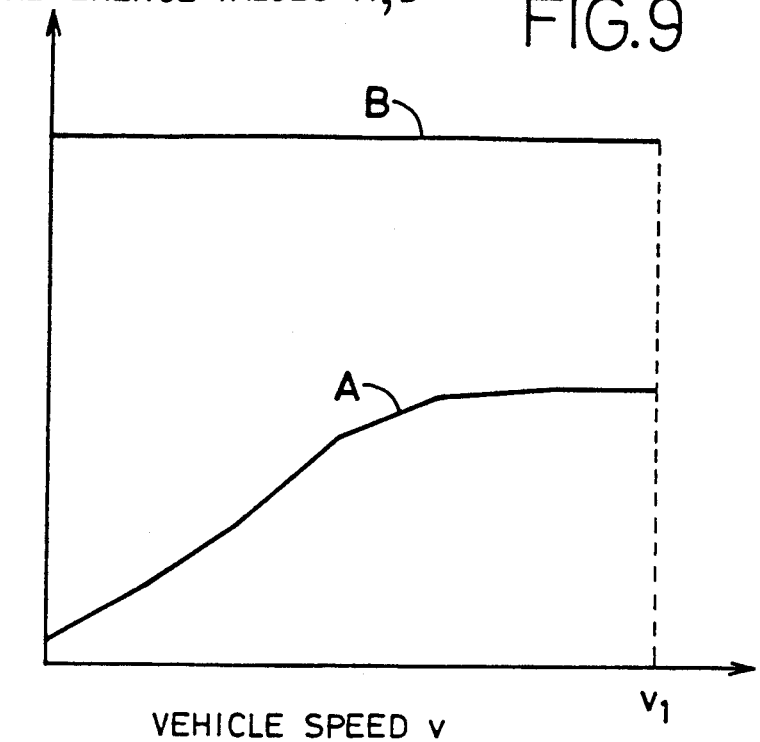
FIG. 9 is a graph indicating a relationship between the reference value and the vehicle speed, used in the operation of FIG. 8.

The CVT RAPID SHIFT-DOWN control routine of FIG. 7 may be replaced by an alternative control routine as illustrated in FIG. 8. In this control routine of FIG. 8, step SS14 is provided between steps SS3 and SS4, to determine whether the currently obtained vehicle deceleration value $\dot{v}$ is larger than a second deceleration reference value B, or not. This reference value B is constant for any vehicle speed "v" up to the threshold value $v_1$, and is higher than the first reference value A, as indicated in FIG. 9. If any one of the wheels slips on a frozen road surface or other road surface having a considerably low friction coefficient, upon brake application, the vehicle deceleration value as calculated based on the wheel speed is abnormally high, and does not correctly represent the actual deceleration value. In this condition, the braking pressure applied to wheel cylinder of the slipping wheel is lowered. If the CVT 14 is shifted down at this time in step SS7, an engine braking is applied to the vehicle because the actual vehicle deceleration value is lower than the calculated value. Consequently, lowering the braking pressure in the anti-lock mode under the control of the anti-lock brake control device 84 will not eliminate the slipping condition of the wheel. In view of this fact, the second deceleration reference value B is determined as the maximum deceleration value below which the CVT 14 can be shifted down without an engine brake applied to the vehicle. The reference value B is higher than a value which can be obtained when a comparatively high braking pressure is applied while the vehicle is running on a dry asphalt pavement.

If a negative decision (NO) is obtained in step SS14, namely, if the calculated deceleration value $\dot{v}$ is not higher than the second reference value B, step SS4 and the subsequent steps are executed. If the calculated deceleration value v is higher than the second reference value B, step SS14 is followed by step SS9 to cancel the CVT RAPID SHIFT-DOWN mode. In the present embodiment of FIGS. 6, 8 and 9, the shift-down operation of the CVT 14 in step SS7 in the CVT RAPID SHIFT-DOWN mode is effected while the calculated vehicle deceleration value v is equal to or lower than the second reference value B and higher than the first reference value A. Since the rapid shift-down operation of the CVT 14 is not effected when the deceleration value v is higher than the second reference value B, an engine brake is not applied to the vehicle while the wheels 24, 74 are excessively slipping. Therefore, the anti-lock braking pressure control will effectively reduce or eliminate the slipping tendency of the wheels. Although the CVT 14 is not sufficiently shifted down where step SS9 is executed following an affirmative decision in step SS14, the vehicle can be relatively smoothly re-started on the road surface having a low friction coefficient, with suitable amounts of slip of the drive wheels 24 on the road surface, even with a relatively high speed ratio "e" of the CVT 14.

The electronic control device 460 for the power transmitting system may also be adapted to operate in the CVT RAPID SHIFT-DOWN mode, as indicated in the flow chart of FIG. 10. This embodiment is advantageous in shifting down the CVT 14 before the vehicle is stopped on an uphill road surface after an inertial running thereon. In this case, the vehicle is more rapidly stopped than on a flat road surface. To permit smooth re-starting of the vehicle, the CVT 14 should be rapidly shifted down to establish a sufficiently low speed ratio "e".

In the control routine of FIG. 10, step SR1 is initially implemented to calculate the vehicle deceleration value $\dot{v}$, according to the equation (1) given above. Then, step SR2 is executed to determine whether the amount of operation of the accelerator pedal is zero, or not, that is whether the engine 10 is in the idling state or not. This determination is effected based on the throttle opening angle $\theta$th represented by the signal received from the THROTTLE sensor 468. If the engine 10 is not idling, step SR2 is followed by step SR10 in which the CVT RAPID SHIFT-DOWN mode is cancelled. Then, step SR11 is executed to reset the flag "F" to zero, and the control flow returns to the main control routine of FIG. 3. If the engine 10 is idling, step SR2 is followed by step SR3 to determine whether the BRAKE switch 472 is ON or not. In the present embodiment, the THROTTLE sensor 468, BRAKE switch 472, VEHICLE speed sensor 462, and a portion of the control device 460 assigned to execute steps SR2 and SR3 and step SR7 (which will be described) constitute means for determining whether the vehicle is undergoing an inertial running on an uphill road surface, or not.

If an affirmative decision (YES) is obtained in step SR3, the control flow goes to step SR10 to cancel the CVT RAPID SHIFT-DOWN mode, and step SR11 in which the flag "F" is reset to zero, and the control flow returns to the main control routine of FIG. 3. If the BRAKE switch 472 is not ON, a negative decision (NO) is obtained in step SR3, whereby step SR4 is executed to determine whether the currently detected vehicle speed "v" is equal to or lower than a threshold value $v_1$ stored in the ROM of the control device 460. This threshold value $v_1$ is a lower limit above which the speed ratio "e" of the CVT 14 cab be sufficiently lowered toward the lowest value, without controlling the CVT 14 in the CVT RAPID SHIFT-DOWN mode. For instance, the reference value $v_1$ is in the neighborhood of 45–50 km/h.

Figure 11:
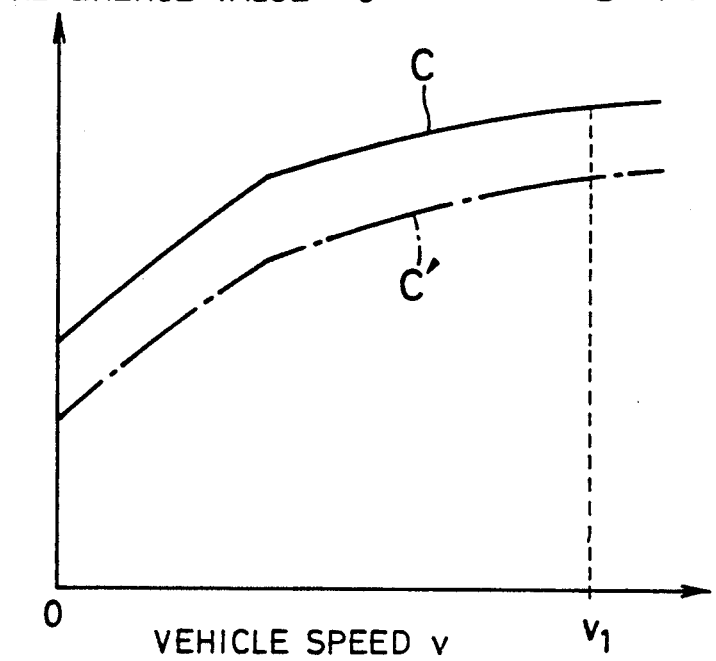
FIG. 11 is a graph indicating a relationship between the reference value and the vehicle speed, used in the embodiment of FIG. 10.

If the detected vehicle running speed "v" is higher than the threshold value $v_1$, the control flow goes to step SR10 indicated above. If the vehicle speed "v" is equal to or lower than the threshold value $v_1$, step SR5 is implemented to determine a third reference value C for the vehicle deceleration value, based on the vehicle speed "v", according to a relationship C=MAP (v) between the value C and the speed "v", which relationship is stored in the ROM. This relationship is experimentally determined for the varying vehicle speed "v", so that the reference value C is the minimum deceleration value of the vehicle above which the CVT 14 can be shifted down to the speed ratio position that permits the vehicle to be smoothly re-started on an uphill road surface. An example of the relationship is represented by a curve of FIG. 11, which is stored as a data map in the ROM of the control device 460.

Step SR5 is followed by step SR6 to determine whether the flag "F" is "1" or not. If a negative decision (NO) is obtained in step SR6, that is, if the CVT 14 is not in the process of being shifted down in the CVT RAPID SHIFT-DOWN mode, step SR7 is implemented to determine whether the deceleration value $\dot{v}$ is larger than the reference value C, or not. If an affirmative decision (YES) is obtained in step SR6, that is, if the CVT 14 is in the process of being shifted down in the CVT RAPID SHIFT-DOWN mode, step SR6 is followed by step SR12 in which a hysteresis value $\alpha$ is subtracted from the reference value C. Then, the control flow goes to step SR13 to determine whether the reference value C is equal to or smaller than zero (0), or not. If a negative decision (NO) is obtained in step SR13, that is, if the reference value C is now positive, step SR7 is implemented. If an affirmative decision (YES) is obtained in step SR13, that is, if the reference value C is equal to zero or negative, the control flow goes to step SR8, skipping step SR7. If step SR8 is implemented for the first time, the first and second solenoid-operated valves 266 and 268 are turned ON and OFF, respectively, to shift down the CVT 14 in the RAPID SHIFT-DOWN mode, irrespective of the currently effective optimum speed ratio "e". If the CVT 14 is in the process of being shifted down, that is, if step SR8 is executed after an affirmative decision (YES) is obtained in step SR6, a shift-down operation of the CVT 14 is continued, with the valves 266, 268 kept in the ON and OFF positions, respectively. Step SR8 is followed by step SR9 to set the flag "F" to "1".

In the present embodiment, a portion of the control device 460 assigned to execute step SR8 constitutes means for shifting down the CVT 14 in the RAPID SHIFT-DOWN mode, when the control device 460 detects an inertial running of the vehicle on an uphill road surface. As explained above, the inertial running of the vehicle on the uphill road surface is detected when an affirmative decision (YES) is obtained in steps SR2 and SR7 and when a negative decision (NO) is obtained in step SR3. The present embodiment therefore permits the vehicle to be smoothly re-started on the uphill road surface. In the case where a brake is applied to the vehicle in the process of inertial running on an uphill road surface, steps SR2-SR8 are executed before the brake is applied (before an affirmative decision is obtained in step SR3), whereby the CVT 14 is shifted down toward the position of the lowest speed ratio "e". The brake application results in further reducing the speed ratio "e" of the CVT 14.

In the above embodiments of FIGS. 4, 7, 8 and 10, the CVT 14 is shifted down at the highest rate in the RAPID SHIFT-DOWN mode. However, the embodiment of FIG. 10 may be modified such that the speed ratio "e" of the CVT 14 is lowered so that the speed Nin of the input shaft 30 coincides with a target speed Nintd, which is the speed of the input shaft 30 detected at the time the inertial running of the vehicle on the uphill road is detected. An example of the modified control routine is illustrated in the flow chart of FIG. 12. In this control routine, steps ST1 through ST9 are identical with steps SR1-SR7, SR12 and SR13 of the control routine of FIG. 10, respectively, with an exception of a third deceleration reference value C' used in step ST5, which is determined according to a predetermined relationship as indicated in one-dot chain line in FIG. 11. This relationship is determined so that the speed ratio "e" of the CVT 14 can be lowered while maintaining the input shaft speed Nintd at the time of detection of an inertial vehicle running of an uphill road surface, so as to permit smooth re-starting of the vehicle on the uphill road surface with the thus lowered speed ratio "e". The reference value C' is smaller than the reference value C used in the preceding embodiment of FIG. 10.

If a negative decision (NO) is obtained in step ST2, ST4 or ST7, or if an affirmative decision (YES) is obtained in step ST3, the control flow goes to step ST10 to clear a register of the RAM (of the control device 460) for storing the target input shaft speed Nintd (at the time of detection of the inertial uphill running of the vehicle). Then, step ST11 is implemented to control the speed ratio "e" of the CVT 14 in the NORMAL CVT FEEDBACK CONTROL mode, such that the detected speed Nin of the input shaft 30 coincides with the desired or optimum value Nin*. In this mode, the desired input shaft speed Nin* is calculated based on the detected throttle opening angle θth, detected vehicle speed "v", and detected shift lever position Ps, according to a predetermined function Nin* = f(θth, v, Ps), which is formulated so as to operate the engine 10 with high fuel economy and drivability.

If an affirmative decision (YES) is obtained in step ST7, that is, if an inertial running of the vehicle on an uphill road surface (natural braking to the vehicle due to the slope of the road surface) is detected, step ST12 is executed to determine whether the content of the register for the target input shaft speed Nintd is zero (0), or not, namely, whether the input shaft speed Nintd at the time of detection of the inertial vehicle running on the uphill road surface has been stored in the register or not. If a negative decision (NO) is obtained in step ST12, this indicates that the target input shaft speed Nintd has already been stored in the register, and the control flow goes to step ST16. If the content of the register is zero, step ST12 is followed by step ST13 in which the speed Nin of the input shaft 30 at the time an affirmative decision (YES) is obtained in step ST7 is stored as the input shaft speed Nintd in the relevant register of the RAM.

Step ST13 is followed by step ST14 to determine whether the target input shaft speed Nintd is equal to or lower than a predetermined upper limit Nin', or not. If an affirmative decision (YES) is obtained in step ST14, the control flow goes to step ST16. If the input shaft speed Nintd is higher than the upper limit Nin', the control flow goes to step ST15 to limit the speed Nintd to the upper limit Nin', and then execute step ST16.

In step ST16, the appropriate CVT shift mode is selected and the duty cycle Ds2 of the second solenoid-operated valve 268 is determined so that the currently detected speed Nin of the input shaft 30 (engine speed Ne) coincides with the stored target input shaft speed Nintd which was at the time of detection of the inertial vehicle running on the uphill road surface. In other words, the CVT 14 is shifted to change the speed ratio "e" so as to zero a control error, i.e., a difference ΔNin between the target value Nintd and the actually detected value Nin (ΔNin = Nintd − Nin). The operation in this step ST16 is illustrated in detail in the flow chart of FIG. 13.

Initially, step SU1 is executed to calculate the control error ΔNin (= Nintd − Nin). Step SU1 is followed by step SU2 to determine or select one of the six CVT shift modes I through VI as indicated in FIG. 14, based on the calculated control error ΔNin. More specifically, the appropriate CVT shift mode is selected depending upon one of six ranges of the control error amount ΔNin as indicated by hatched areas in the right-hand side portion of FIG. 14. The adjacent ranges of the error amount overlap each other at their end portions, so as to avoid control instability when the corresponding adjacent shift modes are repeatedly alternately selected under some conditions. Then, the control flow goes to step SU3 to determine whether the MEDIUM SHIFT-DOWN mode II is currently selected, or not. If a negative decision (NO) is obtained in step SU3, step SU4 is implemented to determine whether the MEDIUM SHIFT-UP mode V is currently selected, or not. If the MEDIUM SHIFT-DOWN mode II is selected, step SU3 is followed by step SU5 to determine the duty cycle Ds2 (%) of the second solenoid-operated valve 268, according to the following equation (2):

$$Ds2 = 100 - K_1 \cdot \Delta Nin \ldots \quad (2)$$

where, $K_1$ is a constant (gain).

If an affirmative decision (YES) is obtained in step SU4, the control flow goes to step SU6 to determine the duty cycle Ds2 (%) according to the following equation (3):

$$Ds2 = -K_2 \cdot \Delta Nin \ldots \quad (3)$$

where, $K_2$ is a constant (gain).

After the duty cycle Ds2 has been determined, the control flow goes to step S8 of the main control routine of FIG. 3, in which the first solenoid-operated valve 266 is turned ON while the second solenoid-operated valve 268 is turned ON and OFF at the determined duty cycle Ds2.

With the control routine of FIG. 12 is repeatedly executed, the CVT 14 is shifted down so that the speed Nin of the input shaft 30 is controlled to the target value Nintd detected at the time of detection of the inertial vehicle running on the uphill road surface.

In the present embodiment, steps ST2, ST3 and ST7 are implemented to detect an abrupt stopping condition of the vehicle, i.e., an inertial vehicle running on an uphill road surface. Upon detection of the inertial running on the uphill road surface, the speed Nin of the input shaft 30 is stored as the target input shaft speed Nintd. In step ST16, the speed ratio "e" of the CVT 14 is controlled so that the detected input shaft speed Nin coincides with the stored target value Nintd. Thus, the CVT 14 is smoothly shifted down toward the position of the lowest speed ratio "e", while the vehicle inertially running up the uphill road is brought to a stop. Accordingly, the vehicle can be smoothly re-started on the uphill road surface. It will be understood that a portion of the control device 460 assigned to execute step ST16 constitutes means for shifting down the CVT 14 upon detection of the inertial running of the vehicle on the uphill road surface.

Figure 15:
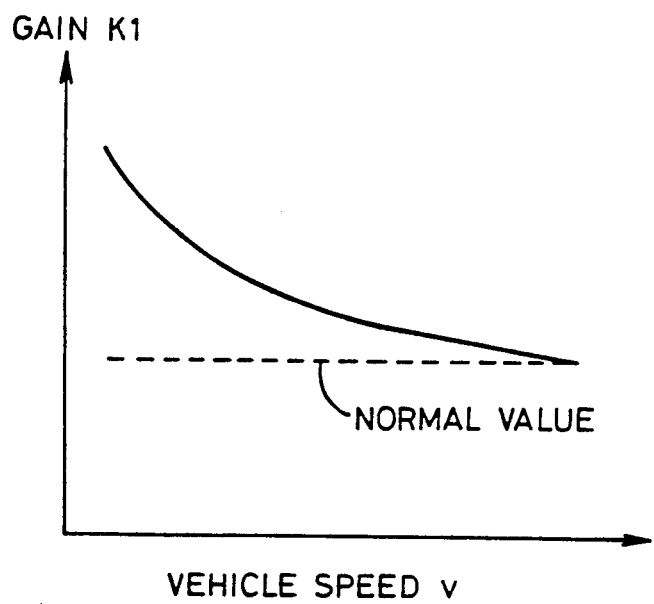
FIG. 15 is a graph indicating a relationship for determining a gain used in an equation for determining the duty cycle of the valve in the medium shift-down mode of FIG. 14.

While the duty cycle Ds2 of the solenoid-operated valve 268 in the MEDIUM SHIFT-DOWN mode II is determined in step ST16 according to the equation (2) given above, the constant (gain) $K_1$ used in the equation (2) may be changed with the vehicle running speed "v", according to a predetermined function $K_1 = f(v)$, as shown by a curve indicated in solid line in FIG. 15. In this case, step for calculating the constant $K_1$ according to the function stored in the ROM of the control device 460 is provided between step ST7 and ST16, for example. This arrangement further improves the smoothness of shifting down the CVT during an inertial running of the vehicle on an uphill road.

Figure 16:
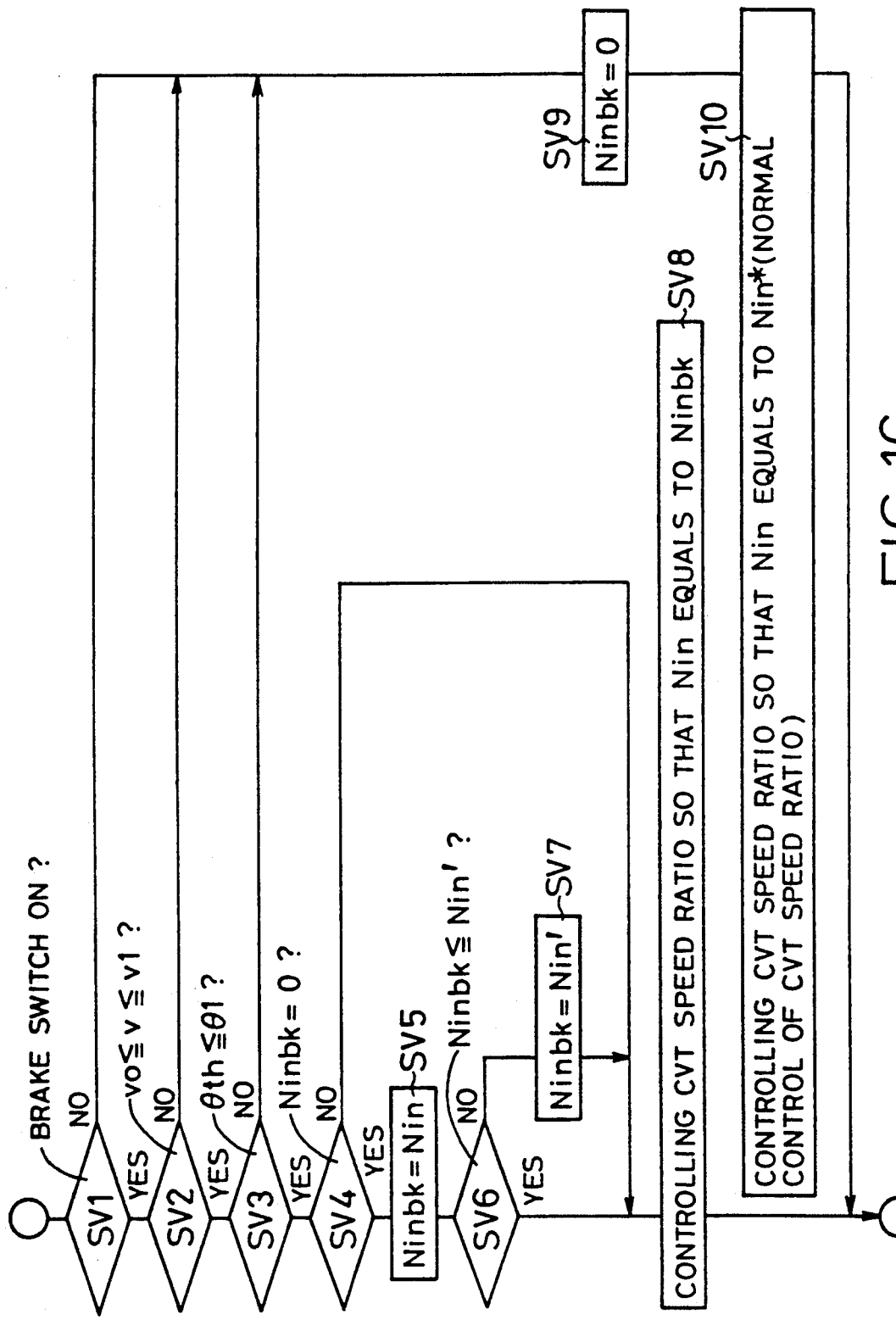
FIG. 16 is a flow chart illustrating part of an operation according to a yet further embodiment of the invention.

The control routine of FIG. 12 may be replaced by a control routine of FIG. 16. In this embodiment of FIG. 16, step SV1 follows steps S1 and S2 of the main control routine of FIG. 3. In step S2, the control device 460 calculates the vehicle speed "v" (speed of the drive wheels 24), and speeds Nin and Nout of the input and output shafts 30 and 38 of the CVT 14, based on the input signals received from the sensors 462, 464, 466. Further, the control device 460 calculates the speed ratio "e" of the CVT 14 based on the calculated input and output shaft speeds Nin and Nout. Then, the control flow goes to step SV1 of FIG. 16, to determine whether the BRAKE switch 472 is ON, or not. In this embodiment, the BRAKE switch 472 and a portion of the control device 460 assigned to execute step SV1 constitute means for detecting an abrupt stopping condition of the vehicle, i.e., abrupt braking of the vehicle.

If the BRAKE switch 472 is not ON, step SV1 is followed by step SV9 to clear the register for a target input shaft speed Ninbk, and step SV10 in which the CVT 14 is controlled in the NORMAL CVT CONTROL mode so that the currently detected speed Nin of the input shaft 30 coincides with the target speed Ni* which is determined according to a predetermined relationship Nin* = f($\theta$th, v, Ps), based on the detected throttle opening angle $\theta$th, vehicle speed "v" and position Ps of the shift lever 252.

In step SV8 corresponding to step ST16 of FIG. 13, the appropriate CVT shift mode is selected, and the duty cycle Ds2 of the second solenoid-operated valve 268 is calculated, according to the equation (2) or (3) given above, depending upon the selected CVT shift mode II or V, as described above by reference to FIG. 13.

After the duty cycle Ds2 has been calculated, the control flow goes to step S8 of the main control routine of FIG. 3, so as to control the valves 266 and 268 according to the selected CVT shift mode II or V and calculated duty cycle Ds2.

With the control routine of FIG. 16 repeatedly executed, the CVT 14 is controlled in the NORMAL CVT CONTROL mode (SV10) or in the RAPID SHIFT-DOWN mode (SV8). The latter mode will be described in detail.

If an affirmative decision (YES) is obtained in step SV1 with the BRAKE switch 472 turned ON, step SV2 is executed to determine whether the detected vehicle speed "v" is held within a range between a lower limit $v_0$ and an upper limit $v_1$ (inclusive). That is, while the vehicle speed "v" is lower than the lower limit value $v_0$, it is not necessary to execute step SV8 for controlling the CVT 14 in the RAPID SHIFT-DOWN mode so as to maintain the input shaft speed Nin at a target level Ninbk which is detected at the time the BRAKE switch 472 was turned ON, i.e., at the time the braking to the vehicle was started. For example, the lower limit value $v_0$ is in the neighborhood of 4 km/h. The execution of step SV8 is not necessary, either, if the vehicle speed "v" is higher than the upper limit value $v_1$, which is about 50 km/h, for example.

If a negative decision (NO) is obtained in step SV2, steps SV9 and SV10 are executed as described above. If an affirmative decision (YES) is obtained in step SV2, the control flow goes to step SV3 to determine whether the detected throttle opening angle $\theta$th is equal to or smaller than a reference value $\theta_1$, or not. The reference value $\theta_1$ is an upper limit below which it is necessary to control the speed ratio "e" of the CVT 14 in step SV8 so as to maintain the input shaft speed Nin at the target value Ninbk, while the vehicle is braked with the BRAKE switch 472 held ON, and with the accelerator pedal held depressed. The reference value $\theta_1$ is in the neighborhood of 11%, for example.

If a negative decision (NO) is obtained in step SV3, steps SV9 and SV10 are implemented. If an affirmative decision (YES) is obtained in step SV3, the control flow goes to step SV4 to determine whether the content of the register for storing the target input shaft speed Ninbk is zero or not. If the content is not zero, step SV4 is followed by step SV8. If the content is zero, this indicates that the target input shaft speed Ninbk has not been stored in the relevant register. In this case, the control flow goes to step SV5 to store as the target input shaft speed Ninbk the speed Nin of the input shaft 30 which was detected upon depression of the brake pedal, i.e., upon detection of the signal from the BRAKE switch 472 in step SV1.

In step SV6, the control device 460 determines whether the stored target input shaft speed Ninbk is equal to or lower than the upper limit Nin' described above with respect to step ST14 of FIG. 12. If the target value Ninbk is higher than the reference value Nin', step SV6 is followed by step SV7 to limit or lower the target value Ninbk to the upper limit Nin'. Step SV7 is followed by step SV8. In step SV8, the speed ratio "e" of the CVT 14 is controlled so that the speed Nin of the input shaft 30 coincides with the stored target value Ninbk, with the duty cycle Ds2 determined based on the control error ΔNin, in substantially the same manner as illustrated in FIG. 13. In this case, however, the control error ΔNin is a difference between Ninbk and Nin.

In the present embodiment, the input shaft speed Nin upon detection of brake application to the vehicle in step SV1 is stored as the target speed Ninbk in step SV5, so that the CVT 14 is shifted down so that the actually detected input shaft speed Nin coincides with the target value Ninbk, in step SV8, and S8 of FIG. 3. This arrangement permits the speed ratio "e" of the CVT 14 to be smoothly lowered, without providing an engine-braking effect. If the CVT 14 is shifted down at an excessively high speed, the speed Ne of the engine 10 is generally raised, and the engine braking is applied due to the energy used to raise the engine speed Ne. According to the present embodiment, however, the engine speed Ne is maintained at the level at the time the brake is applied to the vehicle. Consequently, no energy is used to raise the engine speed Ne, and no engine braking is applied, when the CVT 14 is shifted down. In this embodiment, a portion of the control device 460 assigned to execute steps SV5 and SV8 constitutes means for controlling the speed ratio "e" of the CVT 14 so as to maintain the target or desired input shaft speed Ninbk, when the brake is applied to the vehicle.

In the embodiment of FIG. 16, too, the function as represented by the graph of FIG. 15 may be used to determine the constant or gain $K_1$ used in the equations (2) and (3) for calculating the duty cycle Ds2 of the second solenoid-operated valve 268.

While the present invention has been described above in the presently preferred embodiments with a certain degree of particularity, it is to be understood that the invention may be embodied with various changes, modifications and improvements, which may occur to those skilled in the art.

In the embodiments of FIGS. 4, 7, 8, 10 and 12, the determination as to control the CVT 14 in the RAPID SHIFT-DOWN mode or not is effected based on whether the vehicle deceleration value v̇ calculated from the detected vehicle speed "v" is higher than the reference value or values A, B, C, C'. However, the vehicle deceleration value v̇ may be replaced by another variable substantially representative of the vehicle deceleration value, such as an output of an accelerometer, braking pressure applied to the wheel cylinder, or a depression force acting on the brake pedal.

While the illustrated embodiments are applied to a vehicle power transmitting system in which the first and second line pressures Pl1 and Pl2 are applied to one and the other of the first and second hydraulic cylinders 54, 56, through the shift control valve assembly 260, the principle of the present invention is equally applicable to a vehicle power transmitting system as disclosed in laid-open Publication No. 60-95262 of unexamined Japanese Patent Application, wherein the line pressure of the hydraulic system is always applied to the driven side hydraulic cylinder, while the pressurized fluid is supplied to or discharged from the driving side hydraulic cylinder, to control the speed ratio "e" of the CVT 14.

In the illustrated embodiments, the CVT 14 is controlled in the NORMAL CVT CONTROL mode such that the currently detected speed Nin of the input shaft 30 coincides with the calculated target or desired value Nin*. Since the target or desired speed ratio e* is equal to Nout/Nin*, the CVT 14 may be controlled such that the currently detected speed ratio "e" coincides with the calculated target speed ratio e*.

In the embodiments of FIGS. 10 and 12, the determination of the inertial vehicle running on the uphill road surface is effected depending upon whether the engine 10 is idling or not, whether the BRAKE switch 472 is ON or not and whether the detected vehicle deceleration value v̇ exceeds the predetermined third reference value C or C'. However, the determination may be made based on the other running parameters of the vehicle.

In the embodiment of FIG. 12, the speed ratio "e" of the CVT 14 is controlled such that the detected input shaft speed Nin coincides with the target speed Nintd which is the speed Nin detected at the time an affirmative decision (YES) is obtained in step ST3. However, the input shaft speed Nin need not necessarily coincide with the target value Nintd, but may coincide with a value close to the target value. Also, the target input shaft speed Nintd may be slowly changed with time after the detection of the inertial vehicle running on the uphill road surface.

It is also possible that the control device 460 is adapted to implement both of the control routines of FIGS. 10 and 12. In this case, the two routines are implemented one after the other, since the reference value C is larger than the reference value C'.

Further, the control routine of FIG. 10 or 12 may be combined with the control routine of FIG. 16. In this case, the rapid shift-down action of the CVT 14 is started in step SR 8 of FIG. 10 or ST16 of FIG. 12 before the BRAKE switch 472 is turned ON in step SV1 of the control routine of FIG. 16. Therefore, the vehicle can be re-started with improved smoothness.

In the embodiment of FIG. 16, too, the CVT 14 may be controlled such that the actually detected input shaft speed Nin coincides with a value close to the target value Ninbk detected at the time the BRAKE switch 472 was turned ON. The target value Ninbk may be changed with time after the switch 472 was turned ON.

Although the determination of the brake application is effected based on the signal from the BRAKE switch 472 in the embodiment of FIG. 16, the determination may be made depending upon another parameter representative of the brake application, such as the vehicle deceleration value detected by an accelerometer or detected based on the rate of change in the vehicle speed, or braking pressure detected by a pressure sensor for detecting the fluid pressure in the wheel cylinder. In this case, the rapid shift-down operation of the CVT 14 may be effected without depression of the brake pedal, for example, when the vehicle is inertially running up an uphill road. Accordingly, the CVT 14 is shifted down so as to maintain the input shaft speed Nin at the target value, and the vehicle can be smoothly re-started on the uphill road.

It will be understood that other changes, modifications and improvements may be made in the invention, without departing from the spirit and scope of the invention defined in the following claims.

What is claimed is:

1. An apparatus for controlling a power transmitting system for an automotive vehicle having a continuously variable transmission for transmitting power from an engine of the vehicle to drive wheels, with a controlled speed ratio of the transmission, said transmission including an actuating device for controlling said speed ratio, said apparatus comprising:

vehicle speed determining means for determining a running speed of the vehicle;

vehicle deceleration determining means for determining a deceleration value of the vehicle; and control means including means for determining a first deceleration reference value based on the determined running speed of the vehicle, said first deceleration reference value varying with the running speed of the vehicle, said control means commanding said actuating device to shift down said transmission to lower said speed ratio in a rapid shift-down mode if the deceleration value of the vehicle determined by said vehicle deceleration determining means exceeds said first deceleration reference value.

2. An apparatus according to claim 1, wherein said control means further includes memory means for storing data representative of a predetermined relationship between said running speed of the vehicle and said first deceleration reference value, said relationship being determined such that a rate of increase in said first deceleration reference value decreases with an increase in said running speed of the vehicle, said control means determining a first deceleration reference value by utilizing said predetermined relationship and a determined running speed of the vehicle.

3. An apparatus according to claim 1, further comprising brake detecting means for generating a signal indicative of application of a brake to the vehicle, and wherein said control means determines said first deceleration reference value and determines whether said determined deceleration value of the vehicle exceeds said determined first deceleration reference value, when said signal is generated from said brake detecting means while said determined running speed of the vehicle is equal to a predetermined upper limit or lower.

4. An apparatus according to claim 1, wherein said automotive vehicle includes an anti-lock braking system which has an anti-lock brake control device for controlling a slip ratio of at least one of wheels of the vehicle including said drive wheels, during application of a brake to said at least one wheel, such that said slip ratio is held within a predetermined optimum range, said control means further including means for determining whether said anti-lock brake control device is operating or not, said control means commanding said actuating device to control said speed ratio of said transmission in a normal control mode, if said anti-lock control device is operating.

5. An apparatus according to claim 1, wherein said control means further includes means for determining whether said determined deceleration value of the vehicle exceeds a second deceleration reference value larger than said first deceleration reference value, said control means terminating said rapid shift-down mode of operation if said determined deceleration value exceeds said second deceleration reference value.

6. An apparatus according to claim 5, wherein said second deceleration reference value is constant irrespective of said determined running speed of the vehicle.

7. An apparatus according to claim 1, further comprising inertial uphill running detecting means for detecting an inertial running of the vehicle on an uphill road surface, and wherein said control means commanding said actuating device to shift down said transmission in said rapid shift-down mode if said inertial uphill running of the vehicle on said uphill road surface is detected.

8. An apparatus according to claim 7, wherein said inertial uphill running detecting means includes means for determining whether said engine is idling or not, brake detecting means for generating a signal indicative of application of a brake to the vehicle, and means for determining whether said determined deceleration value of the vehicle exceeds a second deceleration reference value or not, said inertial uphill running detecting means detects said inertial running of the vehicle on said uphill road surface, if said determined deceleration value exceeds said second deceleration reference value while said engine is idling and while said signal is absent.

9. An apparatus according to claim 7, wherein said control means further includes memory means for storing data representative of a predetermined relationship between said determined running speed of the vehicle and said second deceleration reference value, said relationship being determined such that said second deceleration reference value increases with said determined running speed.

10. An apparatus according to claim 7, wherein said control means further includes memory means for storing data representative of a predetermined relationship between said determined running speed of the vehicle and said second deceleration reference value, said relationship being determined such that a rate of increase in said second deceleration reference value decreases with an increase in said determined running speed.

11. An apparatus according to claim 1, further comprising means for determining a speed of said engine, and wherein said control means further includes abrupt vehicle stop detecting means for detecting an abrupt stopping condition of the vehicle, and wherein when said abrupt vehicle stopping condition is detected by said abrupt vehicle stop detecting means, said control means commands said actuating device to control said speed ratio of said transmission such that the detected speed of the engine is maintained at or near a target value which is the speed of the engine which was detected at the time said abrupt stopping condition was detected.

12. An apparatus according to claim 11, wherein said vehicle includes a braking system for applying brake to at least one of wheels including said drive wheels, and said apparatus further comprises throttle detecting means for detecting an opening angle of a throttle valve of said engine, said abrupt vehicle stop detecting means detects said abrupt stopping condition of the vehicle if said braking system is operating to apply brake to said at least one brake, if said determined running speed of the vehicle is lower than a predetermined upper limit, and if the detected opening angle of said throttle valve is lower than a predetermined upper limit.

13. An apparatus according to claim 11, wherein said means for determining a speed of said engine consists of means for detecting a speed of an input shaft of said transmission, and said abrupt vehicle stop detecting means consists of an inertial uphill running detecting means for detecting an inertial running of the vehicle on an uphill road surface, and wherein if said inertial running detecting means detects said inertial running of the vehicle on said uphill road surface, said control means commands said actuating device to control said speed ratio of said transmission such that the detected speed of said input shaft coincides with a target value which is the speed of the engine which was detected at the time said inertial running of the vehicle on said uphill road surface was detected.

14. An apparatus according to claim 13, wherein said inertial running detecting means detects said inertial running of the vehicle on said uphill road surface, if said determined deceleration value of the vehicle exceeds a second deceleration reference value, while said engine is idling and while no braking is applied to the vehicle.

15. An apparatus according to claim 14, wherein said second deceleration value of the vehicle is smaller than said first deceleration reference value, and determined according to a predetermined relationship such that said second deceleration reference value increases with an increase in said determined running speed of the vehicle.

16. An apparatus according to claim 13, wherein when said inertial running detecting means detects said inertial running of the vehicle on said uphill road surface, said control means commands said actuating means to control said speed ratio of said transmission, so as to zero a difference between said detected speed of said input shaft and said target value, according to a control equation which includes a term consisting of a product of said difference and a gain, said gain decreasing with an increase in said determined running speed of the vehicle while said transmission is shifted down.

17. An apparatus for controlling a power transmitting system for an automotive vehicle having wheels and a continuously variable transmission for transmitting power from an engine of the vehicle to drive wheels of said wheels, with a controlled speed ration of the transmission, said transmission including an actuating device for controlling said speed ratio, said apparatus comprising:
wheel speed determining means for determining a speed of at least one of said wheels;
vehicle deceleration determining means for determining a deceleration value of the vehicle, based on the determined speed of said at least one wheel; and
control means including means for determining a first and a second deceleration reference value, said first deceleration reference value being less than said second deceleration reference value, said control means commanding said actuating device to shift down said transmission to lower said speed ratio in a rapid shift-down mode if the determined deceleration value of the vehicle exceeds the determined first deceleration reference value, said control means cancelling said rapid shift-down mode if said determined deceleration value of the vehicle exceeds said second deceleration reference value.

18. An apparatus according to claim 17, wherein said control means further includes memory means for storing data representative of a predetermined first relationship between the determined running speed of the vehicle and said determined first deceleration reference value, said first relationship being determined such that said first deceleration reference value increases with an increase in said determined running speed of the vehicle, said control means determining said first deceleration reference value according to said first relationship.

19. An apparatus according to claim 17, wherein said control means further includes memory means for storing data representative of a predetermined first relationship between the determined running speed of the vehicle and said determined first deceleration reference value, said first relationship being determined such that a rate of increase in said first deceleration reference value decreases with an increase in said determined running speed of the vehicle, said control means determining said first deceleration reference value according to said first relationship.

20. An apparatus according to claim 17, further comprising brake detecting means for generating a signal indicative of application of a brake to the vehicle, and wherein said control means determines said first deceleration reference value and determines whether said determined deceleration value of the vehicle exceeds said determined first deceleration reference value, when said signal is generated from said brake detecting means while said determined running speed of the vehicle is equal to a predetermined upper limit or lower.

21. An apparatus according to claim 17, wherein said second deceleration reference value is constant irrespective of said determined running speed of the vehicle.

22. An apparatus for controlling a power transmitting system for an automotive vehicle having a continuously variable transmission for transmitting power from an engine of the vehicle to drive wheels, with a controlled speed ratio of the transmission, said transmission including an actuating device for controlling said speed ratio, said apparatus comprising:
inertial uphill running detecting means for detecting an inertial running of the vehicle on an uphill road surface; and
control means for commanding said actuating device to shift down said transmission to lower said speed ratio in a rapid shift-down mode if said inertial uphill running detecting means detects said inertial running of the vehicle on said uphill road surface.

23. An apparatus according to claim 22, wherein said inertial uphill running detecting means includes means for determining whether said engine is idling or not, brake detecting means for generating a signal indicative of application of a brake to the vehicle, means for determining a deceleration value of the vehicle, and means for determining whether said determined deceleration value of the vehicle exceeds a deceleration reference value or not, said inertial uphill running detecting means detects said inertial running of the vehicle on said uphill road surface, if said determined deceleration value exceeds said deceleration reference value while said vehicle is idling and while said signal of said brake detecting means is absent.

24. An apparatus according to claim 22, further comprising means for determining a running speed of the vehicle, wherein said control means further includes memory means for storing data representative of a predetermined relationship between said determined running speed of the vehicle and said deceleration reference value, said relationship being determined such that said deceleration reference value increases with said determined running speed.

25. An apparatus according to claim 22, further comprising means for determining a running speed of the vehicle, wherein said control means further includes memory means for storing data representative of a predetermined relationship between said determined running speed of the vehicle and said deceleration reference value, said relationship being determined such that a rate of increase in said deceleration reference value decreases with an increase in said determined running speed.

26. An apparatus for controlling a power transmitting system for an automotive vehicle having a continuously variable transmission for transmitting power from an engine of the vehicle to drive wheels, with a controlled speed ratio of the transmission, said transmission including an actuating device for controlling said speed ratio, said apparatus comprising:

means for determining a speed of said engine;
abrupt vehicle stop detecting means for detecting an abrupt stopping condition of the vehicle; and
control means responsive to the detection of said abrupt stopping condition of the vehicle by said abrupt vehicle stop detecting means, for commanding said actuating device to shift down said transmission to lower said speed ratio of said transmission such that the detected speed of the engine is maintained at or near a target value which is the speed of the engine which was detected at the time said abrupt stopping condition was detected.

27. An apparatus according to claim 26, wherein said vehicle includes a braking system for applying brake to at least one of wheels including said drive wheels, and said apparatus further comprises means for determining a running speed of the vehicle and throttle detecting means for detecting an opening angle of a throttle valve of said engine, said abrupt vehicle stop detecting means detects said abrupt stopping condition of the vehicle if said braking system is operating to apply brake to said at least one wheel, if said determined running speed of the vehicle is lower than a predetermined upper limit, and if the detected opening angle of said throttle valve is lower than a predetermined upper limit.

28. An apparatus according to claim 26, wherein said means for determining a speed of said engine consists of means for detecting a speed of an input shaft of said transmission, and said abrupt vehicle stop detecting means consists of an inertial uphill running detecting means for detecting an inertial running of the vehicle on an uphill road surface, and wherein if said inertial running detecting means detects said inertial running of the vehicle on said uphill road surface, said control means commands said actuating device to control said speed ratio of said transmission such that the detected speed of said input shaft coincides with a target value which is the speed of the engine which was detected at the time said inertial running of the vehicle on said uphill road surface was detected.

29. An apparatus according to claim 28, further comprising vehicle deceleration determining means for determining a deceleration value of the vehicle, and wherein said inertial running detecting means detects said inertial running of the vehicle on said uphill road surface, if the determined deceleration value of the vehicle exceeds a first deceleration reference value, while said engine is idling and while no braking is applied to the vehicle.

30. An apparatus according to claim 29, further comprising vehicle speed determining means for determining a running speed of the vehicle, and wherein said control means determines a second deceleration reference value based on the determined running speed of the vehicle, according to a predetermined relationship between the determined running speed and the determined second deceleration reference value, said control means commanding said actuating device to shift down said transmission in a rapid shift-down mode if the determined deceleration value of the vehicle exceeds said second deceleration reference value, said first deceleration value of the vehicle being smaller than said second deceleration reference value, and determined according to a predetermined relationship such that said first deceleration reference value increases with an increase in said determined running speed of the vehicle.

31. An apparatus according to claim 28, wherein when said inertial running detecting means detects said inertial running of the vehicle on said uphill road surface, said control means commands said actuating means to control said speed ratio of said transmission, so as to zero a difference between said detected speed of said input shaft and said target value, according to a control equation which includes a term consisting of a product of said difference and a gain, said gain decreasing with an increase in said determined running speed of the vehicle while said transmission is shifted down.

* * * * *